(12) United States Patent
Nakagawa et al.

(10) Patent No.: US 7,242,684 B2
(45) Date of Patent: Jul. 10, 2007

(54) ARCHITECTURE FOR SWITCHING PACKETS IN A HIGH-SPEED SWITCHING ENVIRONMENT

(75) Inventors: Yukihiro Nakagawa, Cupertino, CA (US); Takeshi Shimizu, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 1062 days.

(21) Appl. No.: 10/360,094

(22) Filed: Feb. 7, 2003

(65) Prior Publication Data

US 2004/0156358 A1 Aug. 12, 2004

(51) Int. Cl.
*H04B 3/20* (2006.01)
(52) U.S. Cl. .................. 370/389; 370/429; 370/388
(58) Field of Classification Search ............ 370/386, 370/388, 389, 392, 401, 428, 429, 412–417
See application file for complete search history.

(56) References Cited

U.S. PATENT DOCUMENTS

| | | | |
|---|---|---|---|
| 2004/0081184 A1* | 4/2004 | Magill et al. ............... | 370/413 |
| 2005/0036503 A1* | 2/2005 | Rangarajan et al. ......... | 370/412 |
| 2005/0201396 A1* | 9/2005 | Sindhu et al. .............. | 370/401 |
| 2006/0023719 A1* | 2/2006 | Sindhu et al. .............. | 370/392 |
| 2007/0002882 A1* | 1/2007 | Mansour et al. ............ | 370/412 |

OTHER PUBLICATIONS

Cyriel Minkenberg and Ton Engbersen, "A Combined Input and Output Queued Packet-Switched System Based on PRIZMA Switch-on-a Chip Technology," IEEE Communications Magazine, pp. 70-77, Dec. 2000.
James P. G. Sterbenz and Joseph D. Touch, "High-Speed Networking," 5 pages, 2001.
Abhijit K. Choudhury and Ellen L. Hahne, "Dynamic Queue Length Thresholds for Shared-Memory Packet Switches," IEEE/ACM Transactions on Networking, vol. 6, No. 2, pp. 130-140, Apr. 1998.
M. Shreedhar and George Varghese, "Efficient Fair Queuing using Deficit Round Robin," pp. 1-21, Oct. 16, 1995.

* cited by examiner

*Primary Examiner*—Ajit Patel
(74) *Attorney, Agent, or Firm*—Baker Botts L.L.P.

(57) ABSTRACT

A system for switching packets in a high-speed switching environment includes one or more memory structures, multiple input structures that can each write to each of the one or more memory structures, and a first switching structure that couples the input structures to the one or more memory structures. The system also includes multiple output structures that can each read from each of the one or more memory structures and communicate a first portion of a packet to a first component of a communications network before an input structure has received a second portion of the packet from a second component of the communications network. The system also includes a second switching structure that couples the plurality of output structures to the one or more memory structures. The second switching structure is coupled to the one or more memory structures by a first number of links and coupled to the plurality of output structures by a second number of links, and the first number of links is twice or more the second number of links.

20 Claims, 7 Drawing Sheets

ARCHITECTURE FOR SWITCHING PACKETS IN A HIGH-SPEED SWITCHING ENVIRONMENT

BACKGROUND OF THE INVENTION

High-speed serial interconnects have become more common in communications environments, and, as a result, the role that switches play in these environments has become more important. Traditional switches do not provide the scalability and switching speed typically needed to support these interconnects.

SUMMARY OF THE INVENTION

Particular embodiments of the present invention may reduce or eliminate disadvantages and problems traditionally associated with switching packets in a high-speed switching environment.

In one embodiment of the present invention, a system for switching packets in a high-speed switching environment includes one or more memory structures, multiple input structures that can each write to each of the one or more memory structures, and a first switching structure that couples the input structures to the one or more memory structures. The system also includes multiple output structures that can each read from each of the one or more memory structures and communicate a first portion of a packet to a first component of a communications network before an input structure has received a second portion of the packet from a second component of the communications network. The system also includes a second switching structure that couples the plurality of output structures to the one or more memory structures. The second switching structure is coupled to the one or more memory structures by a first number of links and coupled to the plurality of output structures by a second number of links, and the first number of links is twice or more the second number of links.

Particular embodiments of the present invention provide one or more advantages. Particular embodiments reduce memory requirements associated with multicast traffic. In particular embodiments, port modules share memory resources, which tends to eliminate head-of-line blocking, reduce memory requirements, and enable more efficient handling of changes in load conditions at port modules. Particular embodiments provide cut-through forwarding, which provides one or more advantages over store-and-forward techniques. Particular embodiments provide delayed cut-through forwarding, which also provides one or more advantages over store-and-forward techniques. Particular embodiments increase the throughput of a switch core. Particular embodiments increase the speed at which packets are switched by a switch core. Particular embodiments reduce the fall-through latency of a switch core, which is important for cluster applications. Particular embodiments are embodied in a single integrated circuit (IC), or chip. Particular embodiments reduce the power dissipation of a switch core. Particular embodiments can be used in different applications, such as Ethernet switches, INFINIBAND switches, 3GIO switches, HYPERTRANSPORT switches, RAPID IO switches, or proprietary backplane switches. Certain embodiments provide all, some, or none of these technical advantages, and certain embodiments provide one or more other technical advantages readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
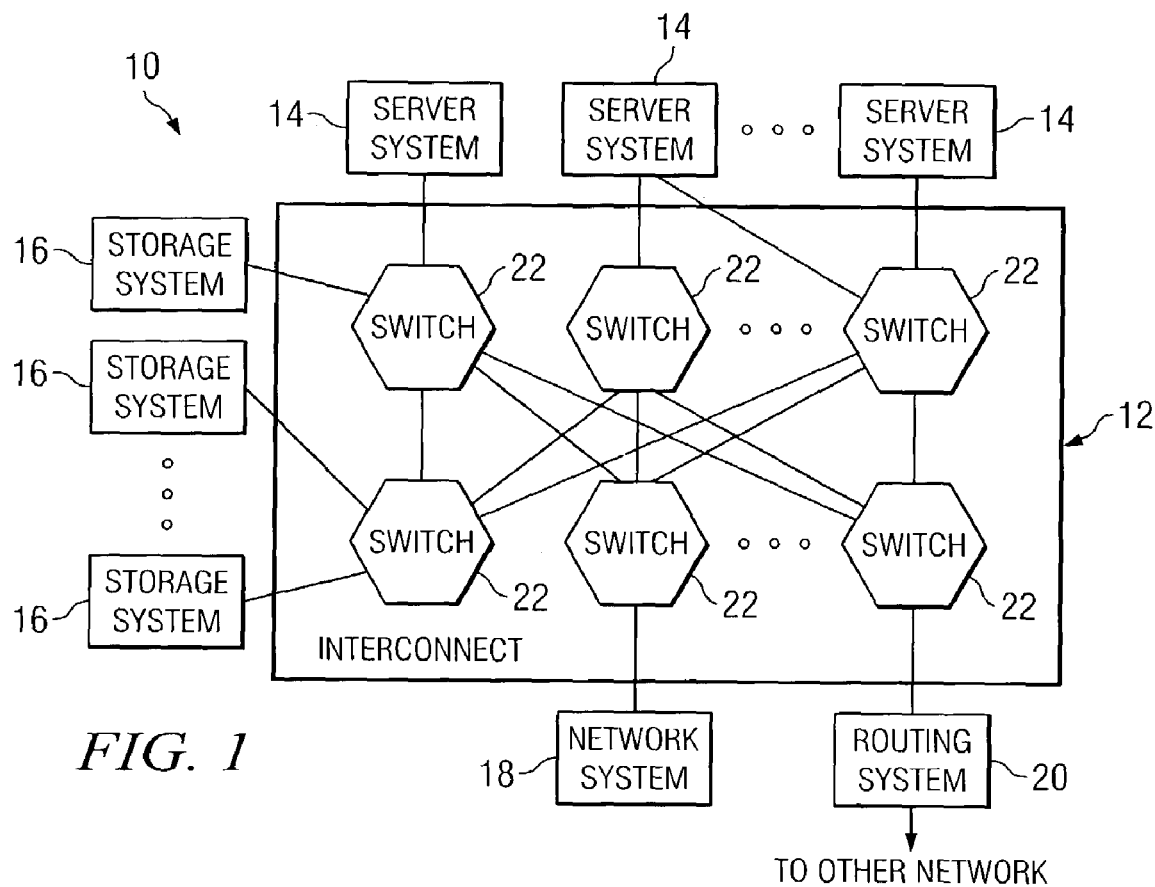
FIG. 1 illustrates an example system area network.

FIG. 1 illustrates an example system area network 10 that includes a serial or other interconnect 12 supporting communication among one or more server systems 14; one or more storage systems 16; one or more network systems 18; and one or more routing systems 20 coupling interconnect 12 to one or more other networks, which include one or more local area networks (LANs), wide area networks (WANs), or other networks. Server systems 14 each include one or more central processing units (CPUs) and one or more memory units. Storage systems 16 each include one or more channel adaptors (CAs), one or more disk adaptors (DAs), and one or more CPU modules (CMs). Interconnect 12 includes one or more switches 22, which, in particular embodiments, include Ethernet switches, as described more fully below. The components of system area network 10 are coupled to each other using one or more links, each of which includes one or more computer buses, local area networks (LANs), metropolitan area networks (MANs), wide area networks (WANs), portions of the Internet, or other wireline, optical, wireless, or other links. Although system area network 10 is described and illustrated as including particular components coupled to each other in a particular configuration, the present invention contemplates any suitable system area network including any suitable components coupled to each other in any suitable configuration.

Figure 2:
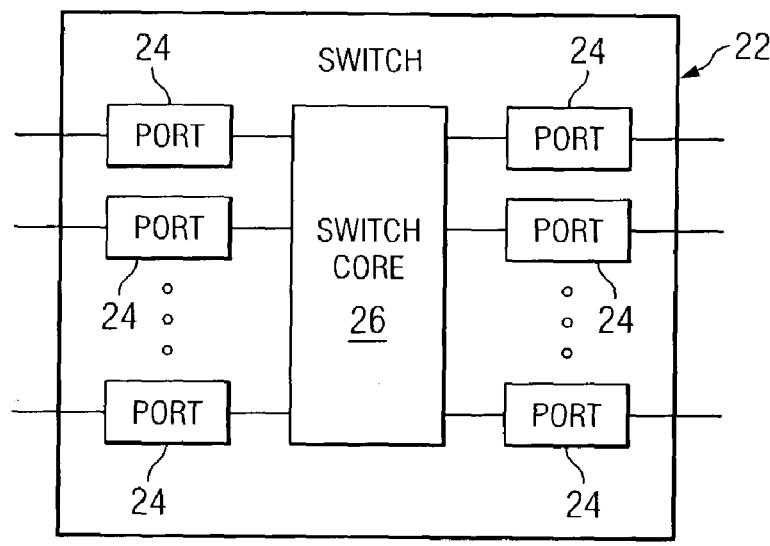
FIG. 2 illustrates an example switch of a system area network.

FIG. 2 illustrates an example switch 22 of system area network 10. Switch 22 includes multiple ports 24 and a switch core 26. Ports 24 are each coupled to switch core 26 and a component of system area network 10 (such as a server system 14, a storage system 16, a network system 18, a routing system 20, or another switch 22). A first port 24 receives a packet from a first component of system area network 10 and communicates the packet to switch core 26 for switching to a second port 24, which communicates the packet to a second component of system area network 10. Reference to a packet can include a packet, datagram, frame, or other unit of data, where appropriate. Switch core 26 receives a packet from a first port 24 and switches the packet to one or more second ports 24, as described more fully below. In particular embodiments, switch 22 includes an Ethernet switch. In particular embodiments, switch 22 can switch packets at or near wire speed.

Figure 3:
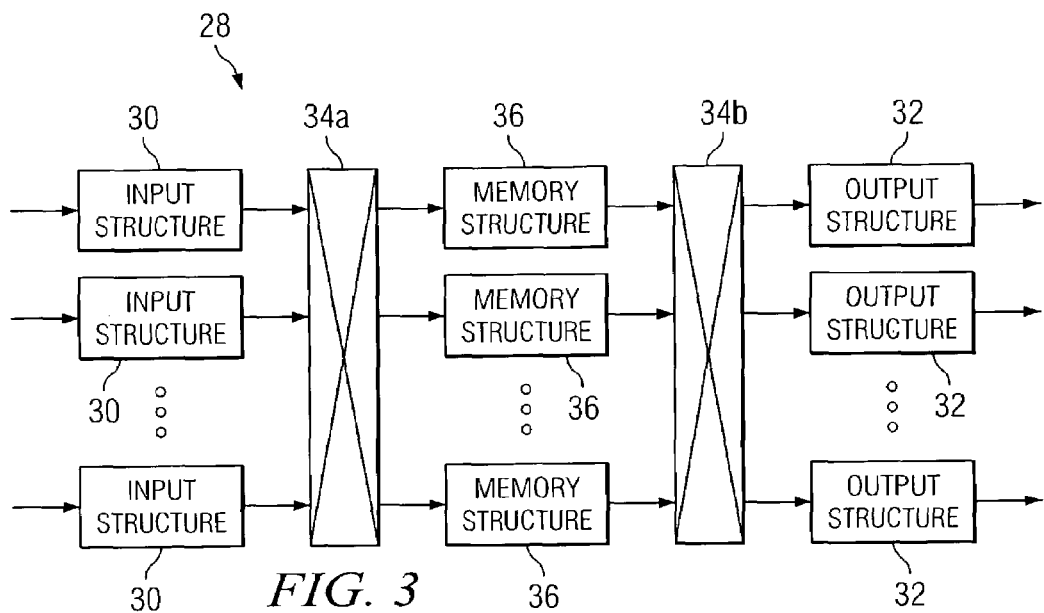
FIG. 3 illustrates an example architecture of a switch core of a switch.

FIG. 3 illustrates an example architecture 28 of switch core 26 of switch 22. Architecture 28 can handle one direction of traffic. Architecture 28 includes one or more input structures 30, one or more output structures 32, two switching structures 34, and one or more memory structures 36. The components of architecture 28 are coupled to each other using buses or other links. In particular embodiments, architecture 28 is embodied in a single IC. Reference to traffic includes one or more packets entering, making their way through, and exiting architecture 28, and reference to a direction of traffic includes packets entering architecture 28 through input structures 30 and exiting architecture 28 through output structures 32. Architecture 28 can be used in different applications. As an example and not by way of limitation, architecture 28 can be used in a switch core 26 of an Ethernet switch 22 (which includes a ten-gigabit Ethernet switch 22 or an Ethernet switch 22 in particular embodiments); a switch core 26 of an INFINIBAND switch 22; a switch core 26 of a 3GIO switch 22; a switch core 26 of a HYPERTRANSPORT switch 22; a switch core 26 of a RAPID IO switch 22; or a switch core 26 of a proprietary backplane switch 22 including one or more storage systems 16, network systems 18, or both.

An input structure 30 provides an interface between switch core 26 and a port 24 of switch 22 and includes input logic for receiving a packet from port 24 and writing the packet to one or more memory structures 36 via switching structure 34*a*. Input structure 30 is coupled to port 24 and switching structure 34*a* using one or more links. An output structure 32 also provides an interface between switch core 26 and a port 24, but includes output logic for reading a packet from one or more memory structures 36 via switching structure 34*b* and communicating the packet to port 24. Output structure 32 is coupled to port 24 and switching structure 34*b* using one or more links. A packet received by an input structure 30 from a first component of system area network 10 is written to one or more memory structures 36 from input structure and later read from memory structures 36 to one or more output structures 32 for communication from output structures 32 to one or more second components of system area network 10. Reference to a packet being received by an input structure 30 or communicated from an output structure 32 includes the entire packet being received or communicated or only a portion of the packet being received or communicated, where appropriate. Similarly, reference to a packet being written to or read from one or more memory structures 36 includes the entire packet being written to or read from memory structures 36 or only a portion of the packet being written to or read from memory structures 36, where appropriate. As described more fully below, in particular embodiments, an input structure 30 can be combined with an output structure 32 such that a single port module 38 (which is described below) embodying input structure 30 and output structure 32 includes both input logic and output logic. As an alternative, in particular embodiments, port module 38 includes only input logic or only output logic.

Switching structure 34*a* receives a packet from an input structure 30 and switches the packet to one or more memory structures 36. Write operations via switching structure 34*a* are scheduled according to a scheduling technique. As an example, in particular embodiments, static scheduling is used for write operations via switching structure 34*a*. As described more fully below, switching structure 34*a* includes one or more components for switching packets between input structures 30 and memory structures 36. As an example, in particular embodiments, switching structure 34*a* includes multiple switching units 40 (which are described below) and multiple bank switching units 42 (which are also described below).

Switching structure 34*b* receives a packet from a memory structure 36 and switches the packet to one or more output structures 32. Read operations via switching structure 34*b* are scheduled according to a scheduling technique. As an example, in particular embodiments, on-demand scheduling is used for read operations via switching structure 34*b*. On-demand scheduling can include a connect and release technique. As described more fully below, switching structure 34*b* includes one or more components for switching packets between output structures 32 and memory structures 36. As an example, in particular embodiments, switching structure 34*b* includes multiple switching units 40 and multiple bank switching units 42. Switching structure 34*b* can be coupled to a memory sturctures 36 by one or more links and can be coupled to an output structure by one or more links, as described above. The total number of links coupling switching structure 34*b* to memory structures 36 can be greater than the total number of links coupling switching structure 34*b* to output structures 32. As an example and not by way of limitation, the total number of links coupling switching structure 34*b* to memory structures 36 can be twice the total number of links coupling switching structure 34*b* to output structures 32. As another example, the total number of links coupling switching structure 34*b* to memory structures 36 can be four times the total number of links coupling switching structure 34*b* to output structures 32.

In particular embodiments, switching structure 34*a* can be combined with switching structure 34*b* such that a single configuration of components for switching packets between input structures 30 and memory structures 36 and between memory structures 36 and output structures 32 embodies both switching structure 34*a* and switching structure 34*b*. In these embodiments, one or more components of the combination can be shared by switching structure 34*a* and switching structure 34*b*, but need not be shared by switching structure 34*a* and switching structure 34*b*. As an alternative, in particular embodiments, switching structure 34*a* can be embodied in a configuration of components for switching packets between input structures 30 and memory structures 36 that is separate from a configuration of components for switching packets between memory structures 36 and output structures 32 in which switching structure 34*b* is embodied. Similarly, switching structure 34*b* can be embodied in a configuration of components for switching packets between memory structures 36 and output structures 32 that is separate from a configuration of components for switching packets between input structures 30 and memory structures 36 in which switching structure 34*a* is embodied.

A packet received by switch core 26 is written to one or more memory structures 36 and subsequently read from memory structures 36 for communication out of switch core 26. A memory structure 36 is coupled to switching structure 34*a* for write operations using one or more links. Memory structure 36 is also coupled to switching structure 34*b* for read operations using one or more links. As an example, in particular embodiments, memory structure 36 is coupled to switching structure 34a using one link and coupled to switching structure 34b using four links, allowing one write operation to memory structure 36 per write cycle (which includes a series of one or more clock cycles of switch core 26 in which one or more packets are written to a memory structure 36) and four read operations from memory structure 36 per read cycle (which includes a series of one or more clock cycles of switch core 26 in which one or more packets are read from a memory structure 36). Memory structure 36 includes one or more components to and from which data can be written and read. As an example, in particular embodiments, memory structure 36 includes one or more static random access memory (SRAM) devices. As described more fully below, in particular embodiments, memory structure 36 includes one or more memory units 46 organized into a memory bank 44.

In particular embodiments, any input structure 30 can write to any memory structure 36, and any output structure 32 can read from any memory structure 36. This sharing of memory structures 36 by input structures 30 and output structures 32 eliminates head-of-line blocking (thereby increasing the throughput of switch core 26), reduces memory requirements associated witch switch core 26, and enables switch core 26 to more efficiently handle changes in load conditions at input structures 30, output structures 32, or both. In particular embodiments, a portion of a packet received by switch core 26 from a first component of system area network 10 can be communicated from switch core 26 to one or more second components of system area network 10 before switch core 26 receives the entire packet. In particular embodiments, this cut-through forwarding provides one or more advantages (such as reduced latency, reduced memory requirements, and increased throughput) over store-and-forward techniques.

In particular embodiments, switch core 26 includes only one architecture 28 for handling only one direction of traffic. As an alternative, in particular embodiments, switch core 26 includes two architectures 28 for handling two directions of traffic. In these embodiments, one or more components of architectures 28 can be combined with each other. As an example, input structures 30 can be combined with output structures 32 and embodied in port modules 38 that include both input logic and output logic, as described above. As another example, switching structure 34a can be combined with input structure 34b such that a single configuration of components for switching packets between input structures 30 and memory structures 36 and between memory structures 36 and output structures 32 embodies both switching structure 34a and switching structure 34b. Although input structures 30 are described as being combined with output structures 32 and switching structure 34a is described as being combined with switching structure 34b, the present invention contemplates any suitable combination of any suitable components of architectures 28 in any suitable configuration. As an example, in an embodiment in which two architectures 28 are combined with each other for handling two directions of traffic, one or more port modules 38 of switch core can include only input logic or only output logic. In addition, switching structure 34a can be embodied in a configuration of components that is separate from a configuration of components in which switching structure 34b is embodied, and vice versa.

Figure 4:
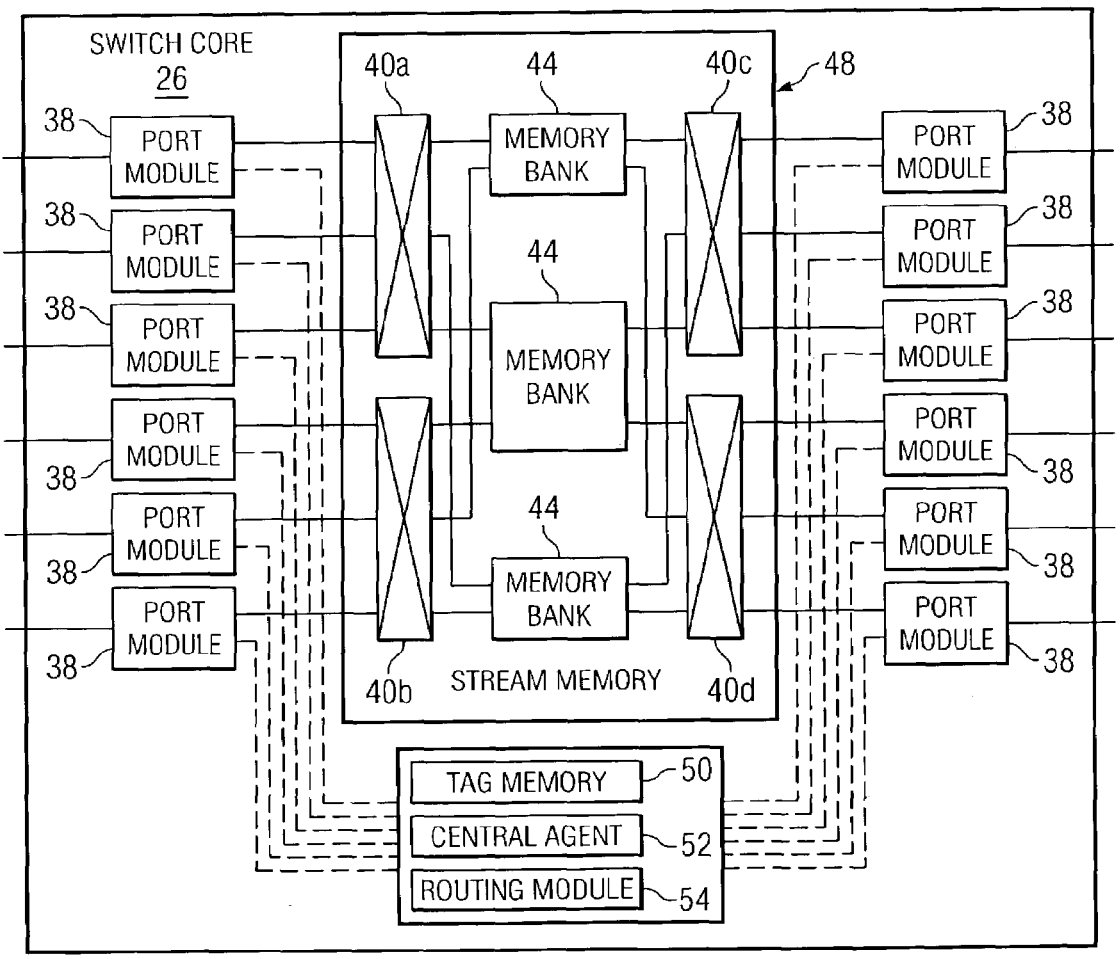
FIG. 4 illustrates an example switch core of a switch.

FIG. 4 illustrates an example switch core 26 of switch 22. Switch core 26 includes two architectures 28 for handling two directions of traffic. Although switch core 26 including two architectures 28 is described and illustrated, the present invention contemplates switch core 26 including two architectures 28 combined in any suitable configuration to any suitable degree. The present invention also contemplates switch core 26 including only one architecture 28 in particular embodiments. Switch core 26 includes twelve port modules 28, stream memory 48, tag memory 50, central agent 52, and routing module 54. The components of switch core 26 are coupled to each other using buses or other links. In particular embodiments, switch core 26 is embodied in a single IC. In a default mode of switch core 26, a packet received by switch core 26 from a first component of system area network 10 can be communicated from switch core 26 to one or more second components of system area network 10 before switch core 26 receives the entire packet. In particular embodiments, cut-through forwarding provides one or more advantages (such as reduced latency, reduced memory requirements, and increased throughput) over store-and-forward techniques. Switch core 26 can be configured for different applications. As an example and not by way of limitation, switch core 26 can be configured for an Ethernet switch 22 (which includes a gigabit Ethernet switch 22 in particular embodiments); an INFINIBAND switch 22; a 3GIO switch 22; a HYPERTRANSPORT switch 22; a RAPID IO switch 22; a proprietary backplane switch 22 for storage systems 16, network systems 18, or both; or other switch 22.

A port module 28 provides an interface between switch core 26 and a port 24 of switch 22. Port module 28 is coupled to port 24, stream memory 48, tag memory 50, central agent 52, and routing table 36. In particular embodiments, port module 28 includes both input logic (which is used for receiving a packet from a component of system area network 10 and writing the packet to stream memory 48) and output logic (which is used for reading a packet from stream memory 48 and communicating the packet to a component of system area network 10). As an alternative, in particular embodiments, port module 28 includes only input logic or only output logic. Reference to a port module 28 can include a port module 28 that includes input logic, output logic, or both, where appropriate. Port module 28 can also include an input buffer for inbound flow control. In an Ethernet switch 22, a pause function can be used for inbound flow control, which can take time to be effective. The input buffer of port module 28 can be used for temporary storage of a packet that is sent before the pause function stops incoming packets. Because the input buffer would be unnecessary if credits are exported for inbound flow control, as would be the case in an INFINIBAND switch 22, the input buffer is optional. In particular embodiments, the link coupling port module 28 to stream memory 48 includes two links: one for write operations (which include operations of switch core 26 in which data is written from a port module 28 to stream memory 48) and one for read operations (which include operations of switch core 26 in which data is read from stream memory 48 to a port module 28). Each of these links can carry thirty-six bits, making the data path between port module 28 and stream memory 48 thirty-six bits wide in both directions.

A packet received by a first port module 28 from a first component of system area network 10 is written to stream memory 48 from first port module 28 and later read from stream memory 48 to one or more second port modules 28 for communication from second port modules 28 to one or more second components of system area network 10. Reference to a packet being received by or communicated from a port module 28 can include the entire packet being received by or communicated from port module 28 or only a portion of the packet being received by or communicated from port module 28, where appropriate. Similarly, reference to a packet being written to or read from stream memory 48 can include the entire packet being written to or read from stream memory 48 or only a portion of the packet being written to or read from stream memory 48, where appropriate. Any port module 28 that includes input logic can write to stream memory 48, and any port module 28 that includes output logic can read from stream memory 48. In particular embodiments, the sharing of stream memory 48 by port modules 28 eliminates head-of-line blocking (thereby increasing the throughput of switch core 26), reduces memory requirements associated with switch core 26, and enables switch core 26 to more efficiently handle changes in load conditions at port modules 28.

Figure 5:
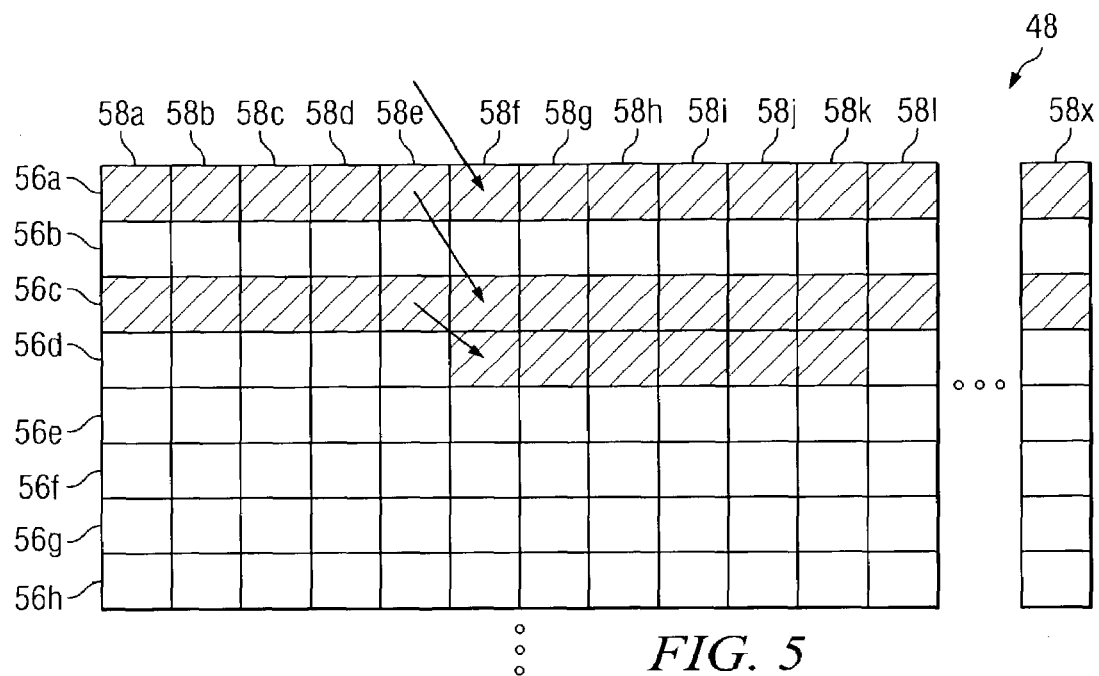
FIG. 5 illustrates an example stream memory of a switch core logically divided into blocks.

Stream memory 48 of switch core 26 is logically divided into blocks 56, which are further divided into words 58, as illustrated in FIG. 5. A row represents a block 56, and the intersection of the row with a column represents a word 58 of block 56. In particular embodiments, stream memory 48 is divided into 1536 blocks 56, each block 56 includes twenty-four words 58, and a word 58 includes seventy-two bits. Although stream memory 48 is described and illustrated as being divided into a particular number of blocks 56 that are divided into a particular number of words 58 including a particular number of bits, the present invention contemplates stream memory 48 being divided into any suitable number of blocks 56 that are divided into any suitable number of words 58 including any suitable number of bits. Packet size can vary from packet to packet. A packet that includes as many bits as or fewer bits than a block 56 can be written to one block 56, and a packet that includes more bits than a block 56 can be written to more than one block 56, which need not be contiguous with each other.

When writing to or reading from a block 56, a port module 28 can start at any word 58 of block 56 and write to or read from words 58 of block 56 sequentially. Port module 28 can also wrap around to a first word 58 of block 56 as it writes to or reads from block 56. A block 56 has an address that can be used to identify block 56 in a write operation or a read operation, and an offset can be used to identify a word 58 of block 56 in a write operation or a read operation. As an example, consider a packet that is 4176 bits long. The packet has been written to fifty-eight words 58, starting at word 58$f$ of block 56$a$ and continuing to word 58$k$ of block 56$d$, excluding block 56$b$. In the write operation, word 58$f$ of block 56$a$ is identified by a first address and a first offset, word 58$f$ of block 56$c$ is identified by a second address and a second offset, and word 58$f$ of block 56$d$ is identified by a third address and a third offset. The packet can also be read from stream memory 48 starting at word 58$f$ of block 56$a$ and continuing to word 58$k$ of block 56$d$, excluding block 56$b$. In the read operation, word 58$f$ of block 56$a$ can be identified by the first address and the first offset, word 58$f$ of block 56$c$ can be identified by the second address and the second offset, and word 58$f$ of block 56$d$ can be identified by the third address and the third offset.

Tag memory 50 includes multiple linked lists that can each be used by a first port module 28 to determine a next block 56 to which to write and by one or more second port modules 28 to determine a next block 56 from which to read. Tag memory 50 also includes a linked list that can be used by central agent 52 to determine a next block 56 that can be made available to a port module 28 for a write operation from port module 28 to stream memory 48, as described more fully below. Tag memory 50 includes multiple entries, at least some of which each correspond to a block 56 of stream memory 48. Each block 56 of stream memory 48 has a corresponding entry in tag memory 50. An entry in tag memory 50 can include a pointer to another entry in tag memory 50, resulting in a linked list.

Entries in tag memory 50 corresponding to blocks 56 that are available to a port module 28 for write operations from port module 28 to stream memory 48 can be linked together such that port module 28 can determine a next block 56 to which to write using the linked entries. As an example, consider four blocks 56 that are available to port module 28 for write operations from port module 28 to stream memory 48. A first entry in tag memory 50 corresponding to a first block 56 includes a pointer to a second block 56, a second entry in tag memory 50 corresponding to second block 56 includes a pointer to a third block 56, and a third entry in tag memory 50 corresponding to third block 56 includes a pointer to a fourth block 56. Port module 28 writes to first block 56 and, while port module 28 is writing to first block 56, uses the pointer in the first entry to determine a next block 56 to which to write. The pointer refers port module 28 to second block 56, and, when port module 28 has finished writing to first block 56, port module 28 writes to second block 56. While port module 28 is writing to second block 56, port module 28 uses the pointer in the second entry to determine a next block 56 to which to write. The pointer refers port module 28 to third block 56, and, when port module 28 has finished writing to second block 56, port module 28 writes to third block 56. While port module 28 is writing to third block 56, port module 28 uses the pointer in the third entry to determine a next block 56 to which to write. The pointer refers port module 28 to fourth block 56, and, when port module 28 has finished writing to third block 56, port module 28 writes to fourth block 56. A linked list in tag memory 50 cannot be used by more than one port module 28 to determine a next block 56 to which to write.

When a block 56 is made available to a port module 28 for write operations from port module 28 to stream memory 48, an entry in tag memory 50 corresponding to block 56 can be added to the linked list that port module 28 is using to determine a next block 56 to which to write. As an example, consider the linked list described above. If the fourth entry is the last element of the linked list, when a fifth block 56 is made available to port module 28, the fourth entry can be modified to include a pointer to fifth block 56.

A linked list in tag memory 50 that a first port module 28 is using to determine a next block 56 to which to write can also be used by one or more second port modules 28 to determine a next block 56 from which to read. As an example, consider the linked list described above. A first portion of a packet has been written from first port module 28 to first block 56, a second portion of the packet has been written from first port module 28 to second block 56, and a third and final portion of the packet has been written from first port module 28 to third block 56. An end mark has also been written to third block 56 to indicate that a final portion of the packet has been written to third block 56. A second port module 28 reads from first block 56 and, while second port module 28 is reading from first block 56, uses the pointer in the first entry to determine a next block 56 from which to read. The pointer refers second port module 28 to second block 56, and, when second port module 28 has finished reading from first block 56, second port module 28 reads from second block 56. While second port module 28 is reading from second block 56, second port module 28 uses the pointer in the second entry to determine a next block 56 from which to read. The pointer refers second port module 28 to third block 56, and, when second port module 28 has finished reading from second block 56, second port module 28 reads from third block 56. Second port module 28 reads from third block 56 and, using the end mark in third block 56, determines that a final portion of the packet has been written to third block 56. While a linked list in tag memory 50 cannot be used by more than one first port module 28 to determine a next block 56 to which to write, the linked list can be used by one or more second port modules 28 to determine a next block 56 from which to read.

Different packets can have different destinations, and the order in which packets make their way through stream memory 48 need not be first in, first out (FIFO). As an example, consider a first packet received and written to one or more first blocks 56 before a second packet is received and written to one or more second blocks 56. The second packet could be read from stream memory 48 before the first packet, and second blocks 56 could become available for other write operations before first blocks 56. In particular embodiments, a block 56 of stream memory 48 to which a packet has been written can be made available to a port module 28 for a write operation from port module 28 to block 56 immediately after the packet has been read from block 56 by all port modules 28 that are designated port modules 28 of the packet. A designated port module 28 of a packet includes a port module 28 coupled to a component of system area network 10, downstream from switch core 26, that is a final or intermediate destination of the packet.

In particular embodiments, credits are allocated to input logic of port modules 28 and are used to manage write operations. Using credits to manage write operations can facilitate cut-through forwarding by switch core 26, which reduces latency, increases throughput, and reduces memory requirements associated with switch core 26. Also, if credits are used to manage write operations, determinations regarding which port module 28 can write to which block 56 at which time can be made locally at port modules 28, which increases the throughput and switching speed of switch core 26. Using credits to manage write operations can also eliminate head-of-line blocking and provide greater flexibility in the distribution of memory resources among port modules 28 in response to changing load conditions at port modules 28. A credit corresponds to a block 56 of stream memory 48 and can be used by a port module 28 to write to block 56. A credit can be allocated to a port module 28 from a pool of credits, which is managed by central agent 52. Reference to a credit being allocated to a port module 28 includes a block 56 corresponding to the credit being made available to port module 28 for a write operation from port module 28 to block 56, and vice versa.

A credit in the pool of credits can be allocated to any port module 28 and need not be allocated to any particular port module 28. A port module 28 can use only a credit that is available to port module 28 and cannot use a credit that is available to another port module 28 or that is in the pool of credits. A credit is available to port module 28 if the credit has been allocated to port module 28 and port module 28 has not yet used the credit. A credit that has been allocated to port module 28 is available to port module 28 until port module 28 uses the credit. A credit cannot be allocated to more than one port module 28 at a time, and a credit cannot be available to more than one port module 28 at the same time. In particular embodiments, when a first port module 28 uses a credit to write a packet to a block 56 corresponding to the credit, the credit is returned to the pool of credits immediately after all designated port modules 28 of the packet have read the packet from block 56.

Central agent 52 can allocate credits to port modules 28 from the pool of credits. As an example, central agent 52 can make an initial allocation of a predetermined number of credits to a port module 28. In particular embodiments, central agent 52 can make an initial allocation of credits to port module 28 at the startup of switch core 26 or in response to switch core 26 being reset. As another example, central agent 52 can allocate a credit to a port module 28 to replace another credit that port module 28 has used. In particular embodiments, when port module 28 uses a first credit, port module 28 notifies central agent 52 that port module 28 has used the first credit, and, in response to port module 28 notifying central agent 52 that port module 28 has used the first credit, central agent 52 allocates a second credit to port module 28 to replace the first credit, but only if the number of blocks 56 that are being used by port module 28 does not meet or exceed an applicable limit. Reference to a block 56 that is being used by a port module 28 includes a block 56 to which a packet has been written from port module 28 and from which all designated port modules 28 of the packet have not read the packet. By replacing, up to an applicable limit, credits used by port module 28, the number of credits available to port module 28 can be kept relatively constant and, if the load conditions at port module 28 increase, more blocks 56 can be supplied to port module 28 in response to the increase in load conditions at port module 28. A limit can be applied to the number of blocks used by port module 28, which can prevent port module 28 from using too many blocks 56 and thereby use up too many shared memory resources. The limit can be controlled dynamically based on the number of credits in the pool of credits. If the number of credits in the pool of credits decreases, the limit can also decrease. The calculation of the limit and the process according to which credits are allocated to port module 28 can take place out of the critical path of packets through switch core 26, which increases the switching speed of switch core 26.

A linked list in tag memory 50 can be used by central agent 52 to determine a next credit that can be allocated to a port module 28. The elements of the linked list can include entries in tag memory 50 corresponding to blocks 56 that in turn correspond to credits in the pool of credits. As an example, consider four credits in the pool of credits. A first credit corresponds to a first block 56, a second credit corresponds to a second block 56, a third credit corresponds to a third block 56, and a fourth credit corresponds to a fourth block 56. A first entry in tag memory 50 corresponding to first block 56 includes a pointer to second block 56, a second entry in tag memory 50 corresponding to second block 56 includes a pointer to third block 56, and a third entry in tag memory 50 corresponding to third block 56 includes a pointer to fourth block 56. Central agent 52 allocates the first credit to a port module 28 and, while central agent 52 is allocating the first credit to a port module 28, uses the pointer in the first entry to determine a next credit to allocate to a port module 28. The pointer refers central agent 52 to second block 56, and, when central agent 52 has finished allocating the first credit to a port module 28, central agent 52 allocates the second credit to a port module 28. While central agent 52 is allocating the second credit to a port module 28, central agent 52 uses the pointer in the second entry to determine a next credit to allocate to a port module 28. The pointer refers central agent 52 to third block 56, and, when central agent 52 has finished allocating the second credit to a port module 28, central agent allocates the third credit to a port module 28. While central agent 52 is allocating the third credit to a port module 28, central agent 52 uses the pointer in the third entry to determine a next credit to allocate to a port module 28. The pointer refers central agent 52 to fourth block 56, and, when central agent 52 has finished allocating the third credit to a port module 28, central agent allocates the fourth credit to a port module 28.

When a credit corresponding to a block 56 is returned to the pool of credits, an entry in tag memory 50 corresponding to block 56 can be added to the end of the linked list that central agent 52 is using to determine a next credit to allocate to a port module 28. As an example, consider the linked list described above. If the fourth entry is the last element of the linked list, when a fifth credit corresponding to a fifth block 56 is added to the pool of credits, the fourth entry can be modified to include a pointer to a fifth entry in tag memory 50 corresponding to fifth block 56. Because entries in tag memory 50 each correspond to a block 56 of stream memory 48, a pointer that points to a block 56 also points to an entry in tag memory 50.

When a port module 28 receives an incoming packet, port module 28 determines whether enough credits are available to port module 28 to write the packet to stream memory 48. In particular embodiments, if enough credits are available to port module 28 to write the packet to stream memory 48, port module 28 can write the packet to stream memory 48 using one or more credits. In particular embodiments, if enough credits are not available to port module 28 to write the packet to stream memory 48, port module 28 can write the packet to an input buffer and later, when enough credits are available to port module 28 to write the packet to stream memory 48, write the packet to stream memory 48 using one or more credits. As an alternative to port module 28 writing the packet to an input buffer, port module 28 can drop the packet. In particular embodiments, if enough credits are available to port module 28 to write only a portion of the packet to stream memory 48, port module 28 can write to stream memory 48 the portion of the packet that can be written to stream memory 48 using one or more credits and write one or more other portions of the packet to an input buffer. Later, when enough credits are available to port module 28 to write one or more of the other portions of the packet to stream memory 48, port module 28 can write one or more of the other portions of the packet to stream memory 48 using one or more credits. In particular embodiments, delayed cut-through forwarding, like cut-through forwarding, provides one or more advantages (such as reduced latency, reduced memory requirements, and increased throughput) over store-and-forward techniques. Reference to a port module 28 determining whether enough credits are available to port module 28 to write a packet to stream memory 48 includes port module 28 determining whether enough credits are available to port module 28 to write the entire packet to stream memory 48, write only a received portion of the packet to stream memory 48, or write at least one portion of the packet to stream memory 48, where appropriate.

In particular embodiments, the length of an incoming packet cannot be known until the entire packet has been received. In these embodiments, a maximum packet size (according to an applicable set of standards) can be used to determine whether enough credits are available to a port module 28 to write an incoming packet that has been received by port module 28 to stream memory 48. According to a set of standards published by the Institute of Electrical and Electronics Engineers (IEEE), the maximum size of an Ethernet frame is 1500 bytes. According to a de facto set of standards, the maximum size of an Ethernet frame is nine thousand bytes. As an example and not by way of limitation, consider a port module 28 that has received only a portion of an incoming packet. Port module 28 uses a maximum packet size (according to an applicable set of standards) to determine whether enough credits are available to port module 28 to write the entire packet to stream memory 48. Port module 28 can make this determination by comparing the maximum packet size with the number of credits available to port module 28. If enough credits are available to port module 28 to write the entire packet to stream memory 48, port module 28 can write the received portion of the packet to stream memory 48 using one or more credits and write one or more other portions of the packet to stream memory 48 using one or more credits when port module 28 receives the one or more other portions of the packet.

A port module 28 can monitor the number of credits available to port module 28 using a counter. When central agent 52 allocates a credit to port module 28, port module 28 increments the counter by an amount, and, when port module 28 uses a credit, port module 28 decrements the counter by an amount. The current value of the counter reflects the current number of credits available to port module 28, and port module 28 can use the counter to determine whether enough credits are available to port module 28 to write a packet from port module 28 to stream memory 48. Central agent 52 can also monitor the number of credits available to port module 28 using a counter. When central agent 52 allocates a credit to port module 28, central agent 52 increments the counter by an amount, and, when port module 28 notifies central agent 52 that port module 28 has used a credit, central agent 52 decrements the counter by an amount. The current value of the counter reflects the current number of credits available to port module 28, and central agent 52 can use the counter to determine whether to allocate one or more credits to port module 28. Central agent 52 can also monitor the number of blocks 56 that are being used by port module 28 using a counter. When port module 28 notifies central agent 52 that port module 28 has written to a block 56, central agent increments the counter by an amount and, when a block 56 to which port module 28 has written is released and a credit corresponding to block 56 is returned to the pool of credits, central agent decrements the counter by an amount.

The number of credits that are available to a port module 28 can be kept constant, and the number of blocks 56 that are being used by port module 28 can be limited. The limit can be changed in response to changes in load conditions at port module 28, one or more other port module 28, or both. In particular embodiments, the number of blocks 56 that are being used by a port module 28 is limited according to a dynamic threshold that is a function of the number of credits in the pool of credits. An active port module 28, in particular embodiments, includes a port module 28 that is using one or more blocks 56. Reference to a port module 28 that is using a block 56 includes a port module 28 that has written at least one packet to stream memory 48 that has not been read from stream memory 48 to all designated port modules 28 of the packet. A dynamic threshold can include a fraction of the number of credits in the pool of credits calculated using the following formula, in which α equals the number of port modules 28 that are active and ρ is a parameter:

$$\frac{\rho}{1+(\rho \times \alpha)}$$

A number of credits in the pool of credits can be reserved to prevent central agent 52 from allocating a credit to a port module 28 if the number of blocks 56 that are each being used by a port module 28 exceeds an applicable limit, which can include the dynamic threshold described above. Reserving one or more credits in the pool of credits can provide a cushion during a transient period associated with a change in the number of port modules 28 that are active. The fraction of credits that are reserved is calculated using the following formula, in which α equals the number of active port modules 28 and ρ is a parameter:

$$\frac{1}{1+(\rho \times \alpha)}$$

According to the above formulas, if one port module 28 is active and ρ is two, central agent 52 reserves one third of the credits and may allocate up to two thirds of the credits to port module 28; if two port modules 28 are active and ρ is one, central agent 52 reserves one third of the credits and may allocate up to one third of the credits to each port module 28 that is active; and if twelve port modules 28 are active and ρ is 0.5, central agent 52 reserves two fourteenths of the credits and may allocate up to one fourteenth of the credits to each port module 28 that is active. Although a particular limit is described as being applied to the number of blocks 56 that are being used by a port module 28, the present invention contemplates any suitable limit being applied to the number of blocks 56 that are being used by a port module 28.

When a first port module 28 writes a packet to stream memory 48, first port module 28 can communicate to routing module 54 information from the header of the packet (such as one or more destination addresses) that routing module 54 can use to identify one or more second port modules 28 that are designated port modules 28 of the packet. First port module 28 can also communicate to routing module 54 an address of a first block 56 to which the packet has been written and an offset that together can be used by second port modules 28 to read the packet from stream memory 48. Routing module 54 can identify second port modules 28 using one or more routing tables and the information from the header of the packet and, after identifying second port modules 28, communicate the address of first block 56 and the offset to each second port module 28, which second port module 28 can add to an output queue, as described more fully below.

Central agent 52 returns a credit to the pool of credits only if all designated port modules 28 of a packet that has been written to a block 56 corresponding to the credit have read from block 56. As an example, consider a packet that has been written to a block 56 and that has two designated port modules 28. First designated port module 28 reads from block 56 and notifies central agent 52 that first designated port module 28 has read from block 56. Because second port module 28 has not yet read from block 56 and notified central agent 52 that second designated port module 28 has read from block 56, central agent 52 does not return a credit corresponding to block 56 to the pool of credits in response to the notification from first port module 28. Later, second designated port module 28 reads from block 56 and notifies central agent 52 that second designated port module 28 has read from block 56. Because first port module 28 has already read from block 56 and notified central agent 52 that first designated port module 28 has read from block 56, central agent 52 returns the credit corresponding to block 56 to the pool of credits in response to the notification from second port module 28.

To determine whether all designated port modules 28 of a packet have read from a block 56 to which the packet has been written, central agent 52 can use a bit vector. A bit vector can include two or more elements that each correspond to a port module 28 and indicate whether port module 28 has read from a block 56. When a packet is written to stream memory 48, central agent 52 can set the elements of a bit vector to indicate which port modules 28 of switch core 26 are designated port modules 28 of the packet, and, as designated port modules 28 read the packet from stream memory 48, central agent 52 can clear the elements of the bit vector.

As an example, consider a bit vector that includes six elements. A first element corresponds to a first port module 28, a second element corresponds to a second port module 28, a third element corresponds to a third port module 28, a fourth element corresponds to a fourth port module 28, a fifth element corresponds to a fifth port module 28, and a sixth element corresponds to a sixth port module 28. A packet is written to a block 56 of stream memory 48, and third port module 28, fourth port module 28, and sixth port module 28 are all designated port modules 28 of the packet. A third element of the bit vector corresponding to third port module 28 is set to indicate that third port module 28 is a designated port module 28 of the packet, a fourth element of the bit vector corresponding to fourth port module 28 is set to indicate that fourth port module 28 is a designated port module 28 of the packet, and a sixth element of the bit vector corresponding to sixth port module 28 is set to indicate that sixth port module 28 is a designated port module 28 of the packet. A first element of the bit vector, a second element of the bit vector, and a fifth element of the bit vector are all left clear, indicating that a first port module, a second port module 28, and a fifth port module 28, respectively, are not designated port modules 28.

Third port module 28 reads from block 56 first, and, when third port module 28 reads from block 56, the third element of the bit vector is cleared. The bit vector indicates that fourth port module 28 and sixth port module 28 have not yet read packet from block 56. Sixth port module 28 reads from block 56 next, and, when sixth port module 28 reads from block 56, the sixth element of the bit vector is cleared. The bit vector indicates that fourth port module 28 has not yet read from block 56. Fourth port module 28 reads from block 56 last, and, when fourth port module 28 reads from block 56, because fourth port module 28 is a last designated port module 28 to read from block 56, a credit corresponding to block 56 is returned to the pool of credits.

A bit vector can be stored in an entry of a multicast state table. The multicast state table can include multiple entries, at least some of which each correspond to a block 56 of stream memory 48. Each block 56 of stream memory 48 has a corresponding entry in tag memory 50. An error detection code (EDC) for detecting single- and multiple-bit errors can also be stored along with a bit vector in an entry in the multicast state table. When a packet has been written to stream memory 48, elements of a bit vector in an entry in the multicast state table corresponding to a first block 56 to which the packet has been written are set to indicate which port modules 28 are designated port modules 28 of the packet, as described above. Only the elements of the bit vector in the entry corresponding to first block 56 to which the packet has been written are set. When a designated port module 28 reads from first block 56, an element corresponding to designated port module 28 is cleared to indicate that designated port module 28 has started reading the packet from stream memory 48. When a last designated port module 28 reads from first block 56, central agent 52 returns a credit corresponding to first block 56 to the pool of credits. Central agent 52 returns credits corresponding to subsequent blocks 56 to which the packet has been written to the pool of credits as last designated port module 28 reads from subsequent blocks 56.

As an example, consider a packet that has been written to stream memory 48. A first portion of the packet has been written to a first block 56, and a second and final portion of the packet has been written to a second block 56. A first credit corresponds to first block 56, and a second credit corresponds to second block 56. A fifth port module 28 and a seventh port module 28 of switch core 26 are designated port modules 28 of the packet. A first entry in a multicast state table corresponds to first block 56, and second entry in the multicast state table corresponds to second block 56. Central agent 52 sets a fifth element and a seventh element of a bit vector in the first entry to indicate that fifth port module 28 and seventh port module 28, respectively, are designated port modules 28 of the packet. Central agent 52 need not set any elements of a bit vector in the second entry. Seventh port module 28 reads from first block 56 and notifies central agent 52 that seventh port module 28 has read from first block 56. Central agent 52 determines, from the bit vector in the first entry, that seventh port module 28 is not a last designated port module 28 to start reading the packet from stream memory 48 and clears the seventh element of the bit vector in the first entry, indicating that seventh port module 28 has started reading the packet from stream memory 48. Because seventh port module 28 is not a last designated port module 28 to start reading the packet from stream memory 48, central agent does not yet return the first credit to the pool of credits.

Fifth port module 28 reads from first port module 28 next and notifies central agent 52 that fifth port module 28 has read from first block 56. Central agent 52 determines, from the bit vector in the first entry, that fifth port module 28 is a last designated port module 28 to start reading the packet from stream memory 48 and, because fifth port module 28 is a last designated port module 28 to start reading the packet from stream memory 48, returns the first credit to the pool of credits. Seventh port module 28 then reads from second port module 28 and notifies central agent 52 that seventh port module 28 has read from second port module 28. Central agent determines, from the bit vector in the first entry, that seventh port module 28 is not a last designated port module 28 to start reading the packet from stream memory 48 and, because seventh port module 28 is not a last designated port module 28 to start reading the packet from stream memory 48, does not yet return second credit to the pool of credits. Fifth port module 28 reads from second port module 28 next and notifies central agent 52 that fifth port module 28 has read from second block 56. Central agent 52 determines, from the bit vector in the first entry, that fifth port module 28 is a last designated port module 28 to start reading the packet from stream memory 48 and, because fifth port module 28 is a last designated port module 28 to start reading the packet from stream memory 48, returns the second credit to the pool of credits.

In the above example, if fifth port module 28 overtook seventh port module 28 and read from second block 56 before seventh port module 28 read from second block 56, the second credit would be returned to the pool of credits before seventh port module 28 read from second block 56. To reduce the likelihood that fifth port module 28 will overtake seventh port module 28, fifth port module 28 and seventh port module 28 can both read from first block 56 and second block 56 at approximately the same speed.

Also, in the above example, if the first credit, after being returned to the pool of credits, were allocated to a port module 28 and used to write to first block 56 before second port module 28 had read from second block 56, the bit vector in the first entry would be overwritten such that central agent 52 would be unable to determine whether fifth port module 28 or seventh port module 28 were a last port module 28 to start reading the packet from stream memory 48. To reduce the likelihood that the bit vector in the first entry will be overwritten, a dynamic threshold can be applied to the number of credits that are available to a port module 28, as described above. The dynamic threshold can prevent the number of credits in the pool of credits from becoming so small that all designated port modules 28 of a packet do not have enough time to read the packet from stream memory 48 before a bit vector is overwritten in an entry in the multicast state table corresponding to a first block 56 to which the packet has been written.

A port module 28 can include one or more output queues that are used to queue packets that have been written to stream memory 48 for communication out of switch core 26 through port module 28. When a packet is written to stream memory 48, the packet is added to an output queue of each designated port module 28 of the packet. An output queue of a designated port module 28 can correspond to a combination of a level of quality of service (QoS) and a source port module 28. As an example, consider a switch core 26 that provides three levels of QoS and includes four port modules 28 including both input logic and output logic. A first port module 28 includes nine output queues: a first output queue corresponding to the first level of QoS and a second port module 28; a second output queue corresponding to the first level of QoS and a third port module 28; a third output queue corresponding to the first level of QoS and a fourth port module 28; a fourth output queue corresponding to the second level of QoS and second port module 28; a fifth output queue corresponding to the second level of QoS and third port module 28; a sixth output queue corresponding to the second level of QoS and fourth port module 28; a seventh output queue corresponding to the third level of QoS and second port module 28; an eighth output queue corresponding to the third level of QoS and third port module 28; and a ninth output queue corresponding to the third level of QoS and fourth port module 28. A packet that has been written to stream memory 48 is added to the first output queue of first port module 28 if (1) the packet has been written to stream memory 48 from second port module 28, (2) first port module 28 is a designated port module 28 of the packet, and (3) the level of QoS of the packet is the first level of QoS. A packet that has been written to stream memory 48 is added to the fifth output queue of first port module 28 if (1) the packet has been written to stream memory 48 from third port module 28, (2) first port module 28 is a designated port module 28 of the packet, and (3) the level of QoS of the packet is the second level of QoS. A packet that has been written to stream memory 48 is added to the ninth output queue of first port module 28 if (1) the packet has been written to stream memory 48 from fourth port module 28, (2) first port module 28 is a designated port module 28 of the packet, and (3) the level of QoS of the packet is the third level of QoS.

Second port module 28 also includes nine output queues: a first output queue corresponding to the first level of QoS and a first port module 28; a second output queue corresponding to the first level of QoS and a third port module 28; a third output queue corresponding to the first level of QoS and a fourth port module 28; a fourth output queue corresponding to the second level of QoS and first port module 28; a fifth output queue corresponding to the second level of QoS and third port module 28; a sixth output queue corresponding to the second level of QoS and fourth port module 28; a seventh output queue corresponding to the third level of QoS and first port module 28; an eighth output queue corresponding to the third level of QoS and third port module 28; and a ninth output queue corresponding to the third level of QoS and fourth port module 28. A packet that has been written to stream memory 48 is added to the first output queue of second port module 28 if (1) the packet has been written to stream memory 48 from first port module 28, (2) second port module 28 is a designated port module 28 of the packet, and (3) the level of QoS of the packet is the first level of QoS. A packet that has been written to stream memory 48 is added to the fifth output queue of second port module 28 if (1) the packet has been written to stream memory 48 from third port module 28, (2) second port module 28 is a designated port module 28 of the packet, and (3) the level of QoS of the packet is the second level of QoS. A packet that has been written to stream memory 48 is added to the ninth output queue of second port module 28 if (1) the packet has been written to stream memory 48 from fourth port module 28, (2) second port module 28 is a designated port module 28 of the packet, and (3) the level of QoS of the packet is the third level of QoS.

Third port module 28 and fourth port module 28 each include output queues similar to the output queues of first port module 28 and the output queues of second port module 28 described above. QoS can encompass rate of transmission, rate of error, or other aspect of the communication of packets through switch core 26, and reference to QoS can include class of service (CoS), where appropriate. Although an output queue of a first port module 28 is described as corresponding to a second port module 28 and a level of QoS, an output queue of a first port module 28 need not necessarily correspond to a second port module 28 and a level of QoS. As an example, in particular embodiments, an output queue of a first port module 28 can correspond to a second port module 28 and not a level of QoS.

An output queue of a port module 28 includes a register of port module 28 and, if there is more than one packet in the output queue, one or more entries in a memory structure of port module 28, as described below. A port module 28 includes a memory structure that can include one or more linked lists that port module 28 can use, along with one or more registers, to determine a next packet to read from stream memory 48. The memory structure includes multiple entries, at least some of which each correspond to a block 56 of stream memory 48. Each block 56 of stream memory 48 has a corresponding entry in the memory structure. An entry in the memory structure can include a pointer to another entry in the memory structure, resulting in a linked list. A port module 28 also includes one or more registers that port module 28 can also use to determine a next packet to read from stream memory 48. A register includes a write pointer, an offset, and a read pointer. The write pointer can point to a first block 56 to which a first packet has been written, the offset can indicate a first word 58 to which the first packet has been written, and the read pointer can point to a first block 56 to which a second packet (which could be the same packet as or a packet other than the first packet) has been written. Because entries in the memory structure each correspond to a block 56 of stream memory 48, a pointer that points to a block 56 also points to an entry in the memory structure.

Port module 28 can use the write pointer to determine a next entry in the memory structure to which to write an offset. Port module 28 can use the offset to determine a word 58 of a block 56 at which to start reading from block 56. Port module 28 can use the read pointer to determine a next packet to read from stream memory 48. Port module 28 can also use the write pointer and the read pointer to determine whether more than one packet is in the output queue. If output queue is not empty and the write pointer and the read pointer both point to the same block 56, there is only one packet in the output queue. If there is only one packet in the output queue, port module 28 can determine a next packet to read from stream memory 48 and read the next packet from stream memory 48 without accessing the memory structure.

If a first packet is added to the output queue when there are no packets in the output queue, (1) the write pointer in the register is modified to point to a first block 56 to which the first packet has been written, (2) the offset is modified to indicate a first word 58 to which the first packet has been written, and (3) the read pointer is also modified to point to first block 56 to which the first packet has been written. If a second packet is added to the output queue before port module 28 reads the first packet from stream memory 48, (1) the write pointer is modified to point to a first block 56 to which the second packet has been written, (2) the offset is written to a first entry in the memory structure corresponding to first block 56 to which the first packet has been written and then modified to indicate a first word 58 to which the second packet has been written, and (3) a pointer in the first entry is modified to point to first block 56 to which the second packet has been written. The read pointer is left unchanged such that, after the second packet is added to the output queue, the read pointer still points to first block 56 to which the first packet has been written. As described more fully below, the read pointer is changed when port module 28 reads a packet in the output queue from stream memory 48. If a third packet is added to the output queue before port module 28 reads the first packet and the second packet from stream memory 48, (1) the write pointer is modified to point to a first block 56 to which the third packet has been written, (2) the offset is written to a second entry in the memory structure corresponding to first block 56 to which the second packet has been written and modified to indicate a first word 58 to which the third packet has been written, and (3) a pointer in the second entry is modified to point to first block 56 to which the third packet has been written. The read pointer is again left unchanged such that, after the third packet is added to the output queue, the read pointer still points to first block 56 to which the first packet has been written.

Port module 28 can use the output queue to determine a next packet to read from stream memory 48. As an example, consider the output queue described above in which there are three packets. In the register, (1) the write pointer points to first block 56 to which the third packet has been written, (2) the offset indicates first word 58 to which the third packet has been written, and (3) the read pointer points to first block 56 to which the first packet has been written. The first entry in the memory structure includes (1) an offset that indicates first word 58 to which the first packet has been written and (2) a pointer that points to first block 56 to which the second packet has been written. The second entry in the memory structure includes (1) an offset that indicates first word 58 to which the second packet has been written and (2) a pointer that points to first block 56 to which the third packet has been written.

Port module 28 compares the read pointer with the write pointer and determines, from the comparison, that there is more than one packet in the output queue. Port module 28 then uses the read pointer to determine a next packet to read from stream memory 48. The read pointer refers port module 28 to first block 56 of the first packet, and, since there is more than one packet in the output queue, port module 28 accesses the offset in the first entry indicating first word 58 to which the first packet has been written. Port module 28 then reads the first packet from stream memory 48, using the offset in the first entry, starting at first block 56 to which the first packet has been written. If the first packet has been written to more than one block 56, port module 28 can use a linked list in tag memory 50 to read the first packet from memory, as described above.

While port module 28 is reading the first packet from stream memory 48, port module 28 copies the pointer in the first entry to the read pointer, compares the read pointer with the write pointer, and determines, from the comparison, that there is more than one packet in the output queue. Port module 28 then uses the read pointer to determine a next packet to read from stream memory 48. The read pointer refers port module 28 to first block 56 of the second packet, and, since there is more than one packet in the output queue, port module 28 accesses the offset in the second entry indicating first word 58 to which the second packet has been written. When port module 28 has finished reading the first packet from stream memory 48, port module 28 reads the second packet from stream memory 48, using the offset in the second entry, starting at first block 56 to which the second packet has been written. If the second packet has been written to more than one block 56, port module 28 can use a linked list in tag memory 50 to read the second packet from memory, as described above.

While port module 128 is reading the second packet from stream memory 48, port module 28 copies the pointer in the second entry to the read pointer, compares the read pointer with the write pointer, and determines, from the comparison, that there is only one packet in the output queue. Port module 28 then uses the read pointer to determine a next packet to read from stream memory 48. The read pointer refers port module 28 to third block 56 of the second packet, and, since there is only one packet in the output queue, port module 28 accesses the offset in the register indicating first word 58 to which the third packet has been written. When port module 28 has finished reading the second packet from stream memory 48, port module 28 reads the third packet from stream memory 48, using the offset in the register, starting at first block 56 to which the third packet has been written. If the third packet has been written to more than one block 56, port module 28 can use a linked list in tag memory 50 to read the third packet from memory, as described above.

If a port module 28 includes more than one output queue, an algorithm can be used for arbitration among the output queues. Arbitration among multiple output queues can include determining a next output queue to use to determine a next packet to read from stream memory 48. Arbitration among multiple output queues can also include determining how many packets in a first output queue to read from stream memory 48 before using a second output queue to determine a next packet to read from stream memory 48. The present invention contemplates any suitable algorithm for arbitration among multiple output queues. As an example and not by way of limitation, according to an algorithm for arbitration among multiple output queues of a port module 28, port module 28 accesses output queues that are not empty in a series of rounds. In a round, port module 28 successively accesses the output queues in a predetermined order and, when port module 28 accesses an output queue, reads one or more packets in the output queue from stream memory 48. The number of packets that port module 28 reads from an output queue in a round can be the same as or different from the number of packets that port module 28 reads from each of one or more other output queues of port module 28 in the same round. In particular embodiments, the number of packets that can be read from an output queue in a round is based on a quantum value that defines an amount of data according to which more packets can be read form the output queue if smaller packets are in the output queue and fewer packets can be read from the output queue if larger packets are in the output queue, which can facilitate fair sharing of an output link of port module 28.

In particular embodiments, a port module 38 uses a connection to access stream memory 48. In these embodiments, port module 38 establishes a connection to stream memory 48, accesses stream memory 48 using the connection, and, if necessary, releases the connection. When accessing stream memory 48 using a connection, port module 38 experiences no blocking by other port modules 38. In particular embodiments, there is always a connection between a port module 38 and stream memory 48 (and there is no arbitration delay) for write operations. A write operation includes a number of steps over a series of cycles (each of which includes one or more clock cycles of switch core 26). As an example and not by way of limitation, stream memory 48 communicates one or more sync bits to port module 38 (which indicate a word offset for the write operation) and port module 38 writes to stream memory 48 and communicates one or more addresses of one or more blocks 56 of stream memory 48 for the write operation to stream memory 48.

A read operation (in which arbitration and access are pipelined) also includes a number of steps over a series of cycles. As an example and not by way of limitation, port module 38 requests a connection for a read operation from stream memory 48 and communicates a word offset to stream memory 48. After an arbitration cycle spanning one or more clock cycles of switch core 26, stream memory 48 communicates an acknowledgment to port module 38 in response to the request, at which point the requested connection is established. In particular embodiments, there is an estimated minimum arbitration delay (which includes a delay between a connection being requested and an acknowledgement being communicated) of zero clock cycles and a maximum estimated arbitration delay of fourteen clock cycles. Arbitration delay causes gaps in streams of data through switch core 26, and the average arbitration delay that port module 38 experiences tends to increase as the load experienced by switch core 26 increases. After port module 38 receives the acknowledgement, port module 38 communicates to stream memory 48 one or more addresses of blocks 56 of stream memory 48 for the read operation, and, one or more cycles later, stream memory 48 communicates the data at those addresses to port module 38. Stream memory 48 can begin to communicate the data before port module 38 has communicated to stream memory 48 all the addresses for the read operation. When port module 38 has communicated to stream memory 48 all the addresses for the read operation, port module 38 releases the connection and, in particular embodiments, requests another connection, possibly in the same cycle. More read operations from stream memory 30 than write operations to stream memory 30 can be scheduled over a period of time. As an example and not by way of limitation, twice as many read operations can be scheduled over a period of time than write operations over the same period of time. As another example, three times as many read operations can be scheduled over a period of time than write operations over the same period of time.

In particular embodiments, stream memory 48 includes a number of static random access memory (SRAM) devices used in parallel with each other, and access to the SRAM devices of stream memory 48 is scheduled using an appropriate interleaving technique. The present invention contemplates 1RW (or single port) SRAM devices, multi-port and multi-bit SRAM devices, or other SRAM devices, although 1RW SRAM devices provide greater density, flexibility, and fewer wires for access to streams of data. If switch core 26 includes N port modules 38 and the links between stream memory 48 and port modules 38 each carry M bits, stream memory 48, in particular embodiments, includes 2*N instances of 1RW SRAM devices having data paths that are 2*M bits wide. As an example and not by way of limitation, if switch core 26 includes twelve port modules 38 and the links coupling port modules 38 to stream memory 48 each carry thirty-six bits, stream memory 48 includes twenty-four instances of 1RW SRAM devices having data paths that are seventy-two bits wide. The number of instances of SRAM devices and the width of the data paths are based on the following observations: (1) the total bandwidth of port modules 38 is N*M bits per second for read operations and N*M bits per second for write operations, and the total bandwidth of stream memory 48 is 4*N*M bits per second; (2) read operations and write operations to and from stream memory 48 are scheduled such that N*M bits per second are reserved for write operations and 3*N*M bits per second are reserved for read operations; and (3) providing two to three times more bandwidth for read operations than for write operations reduces the arbitration delay of switch core 26. Although stream memory 48 is described as including SRAM devices, the present invention contemplates stream memory 48 including any suitable memory devices.

In particular embodiments, a multistage interconnection network (MIN) including switching structure 34a and switching structure 34b is used to provide connections between all the SRAM devices of stream memory 48 and all port modules 38 of switch core. The MIN includes a hierarchical structure including a number of switching units 40 and a number of memory banks 44 (into which the SRAM devices of stream memory 48 are organized) that include bank switching units 42, as described more fully below. The MIN of stream memory 48 illustrated in FIG. 4 includes four switching units 40 and three memory banks 44. Although stream memory 48 is described and illustrated as including a particular number of switching units 40 and a particular number of memory banks 44 in a particular configuration, the present invention contemplates stream memory 48 including any suitable number of switching units 40 and any suitable number of memory banks 44 in any suitable configuration. Bank switching units 42 include statically scheduled, regular switching units. In particular embodiments, static scheduling is used for write operations and on-demand scheduling at switching units 40 is used for read operations. The MIN of stream memory 48 is non-blocking, but without redundancy.

Figure 6:
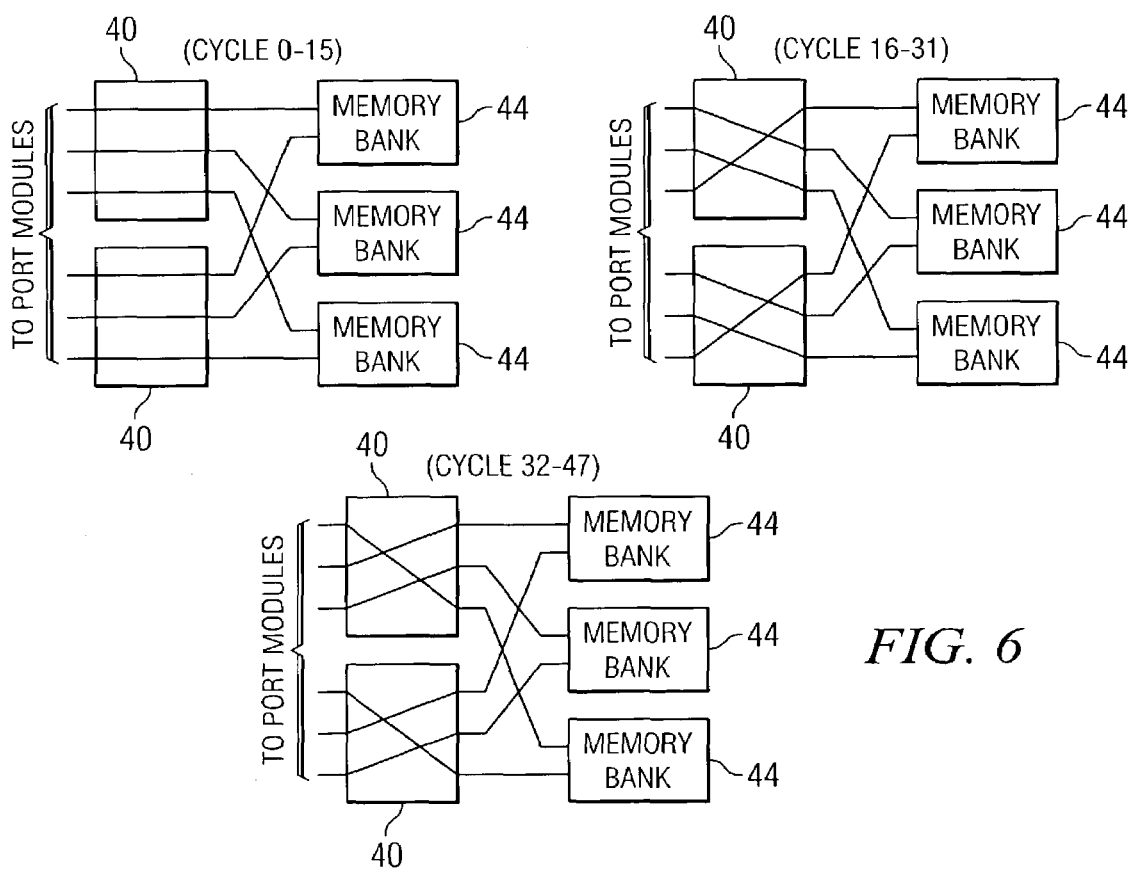
FIG. 6 illustrates example scheduling at two switching units of a switch core for write operations to three memory banks by six port modules.

A switching unit 40 can receive all or a portion of a packet from a port module 38 and switch the received data to a memory bank 44. Write operations via a switching unit 40 are scheduled according to any suitable technique. As an example, static scheduling at a switching unit 40 is used for write operations. FIG. 6 illustrates example scheduling at two switching units 40 of switch core 26 for write operations to three memory banks 44 by six port modules 38. In particular embodiments, as an example and not by way of limitation, switching units 40 return to an initial state every forty-eight cycles. Over the forty-eight cycles, each port module 38 is given an opportunity to write to each memory unit 46 (which are described more fully below) of each memory bank 44. Although switching units 40 are described as returning to an initial state every forty-eight cycles, the present invention contemplates switching units 40 returning to an initial state after any suitable number of cycles. Each switching unit 40 has three states and changes states every sixteen cycles. Although a particular schedule at a particular number of switching units 40 over a particular number of cycles is described and illustrated for write operations to a particular number of memory banks 44 by a particular number of port modules 38, the present invention contemplates any suitable schedule at any suitable number of switching units 40 over any suitable number of cycles for write operations to any suitable number of memory banks 44 by any suitable number of port modules 38.

Switching unit 40 can also receive all or a portion of a packet from a memory bank 44 and switches the received data to a port module 38. Read operations via a switching unit 40 are scheduled according to any suitable technique. As an example, on-demand scheduling at a switching unit 40 is used for read operations. This scheduling includes a connect and release technique, since more than one port module 38 could attempt to read from a memory unit 46 in the same cycle. If static scheduling were used, in particular embodiments, a port module 38 would have to wait up to forty-eight cycles to read from a particular memory unit 46 of a particular memory bank 44. To reduce this delay, arbitration at a switching unit 40 among port modules 38 coupled to switching unit 40 is used for read operations. The availability of each memory unit 46 for read operations is monitored and a particular port module 38 is allowed to read from a particular memory unit 46 of a particular memory bank 44 every four or eight cycles unless another port module 38 is reading from memory unit 46.

Figure 7:
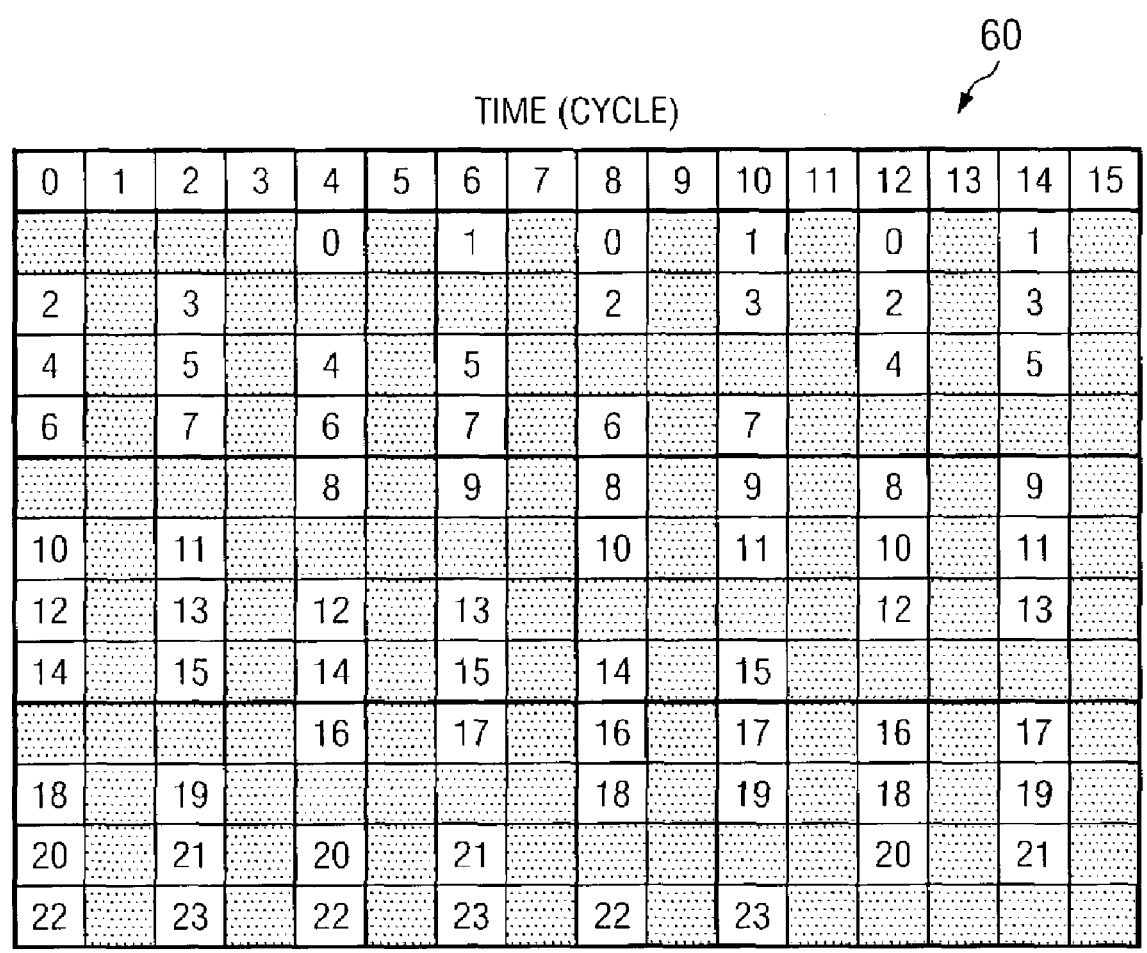
FIG. 7 illustrates example scheduling at a switching unit of a switch core for read operations from twenty-four memory units by a port module.

FIG. 7 illustrates example scheduling at a switching unit 40 of switch core 26 for read operations from twenty-four memory units 46 (within memory banks 44) by a port module 38. Three port modules 38 are coupled to switching unit 40, and each memory unit 46 is designated in schedule 60 by a number from zero to twenty-three. Read operations span two cycles and, according to schedule 60, begin in cycles zero, two, four, six, eight, ten, twelve, and fourteen. Port module 38 can read from any one of nine memory units 46 in a read cycle (which include two cycles for a read operation). In the read cycle spanning cycles zero and one, port module 38 can read from memory unit 46 designated 2, 4, 6, 10, 12, 14, 18, 20, or 22 if no other port module 38 coupled to switching unit 40 is reading from memory unit 46; in the read cycle spanning cycles two and three, port module 38 can read from memory unit 46 designated 3, 5, 7, 11, 13, 15, 19, 21, or 23 if no other port module 38 coupled to switching unit 40 is reading from memory unit 46; in the read cycle spanning cycles four and five, port module 38 can read from memory unit 46 designated 0, 4, 6, 8, 12, 14, 16, 20, or 22 if no other port module 38 coupled to switching unit 40 is reading from memory unit 46; and so on. Similar scheduling at switching unit 40 is used for read operations from memory units 38 to other port modules 38 coupled to switching unit 40 and to other port modules 38 coupled to other switching units in switch core 26. Although a particular schedule at a switching unit 40 over a particular number of cycles is described and illustrated for read operations from a particular number of memory units 46 by a port module 38, the present invention contemplates any suitable schedule at a switching unit 40 over any suitable number of cycles for read operations from any suitable number of memory units 46 by a port module 38.

Figure 8:
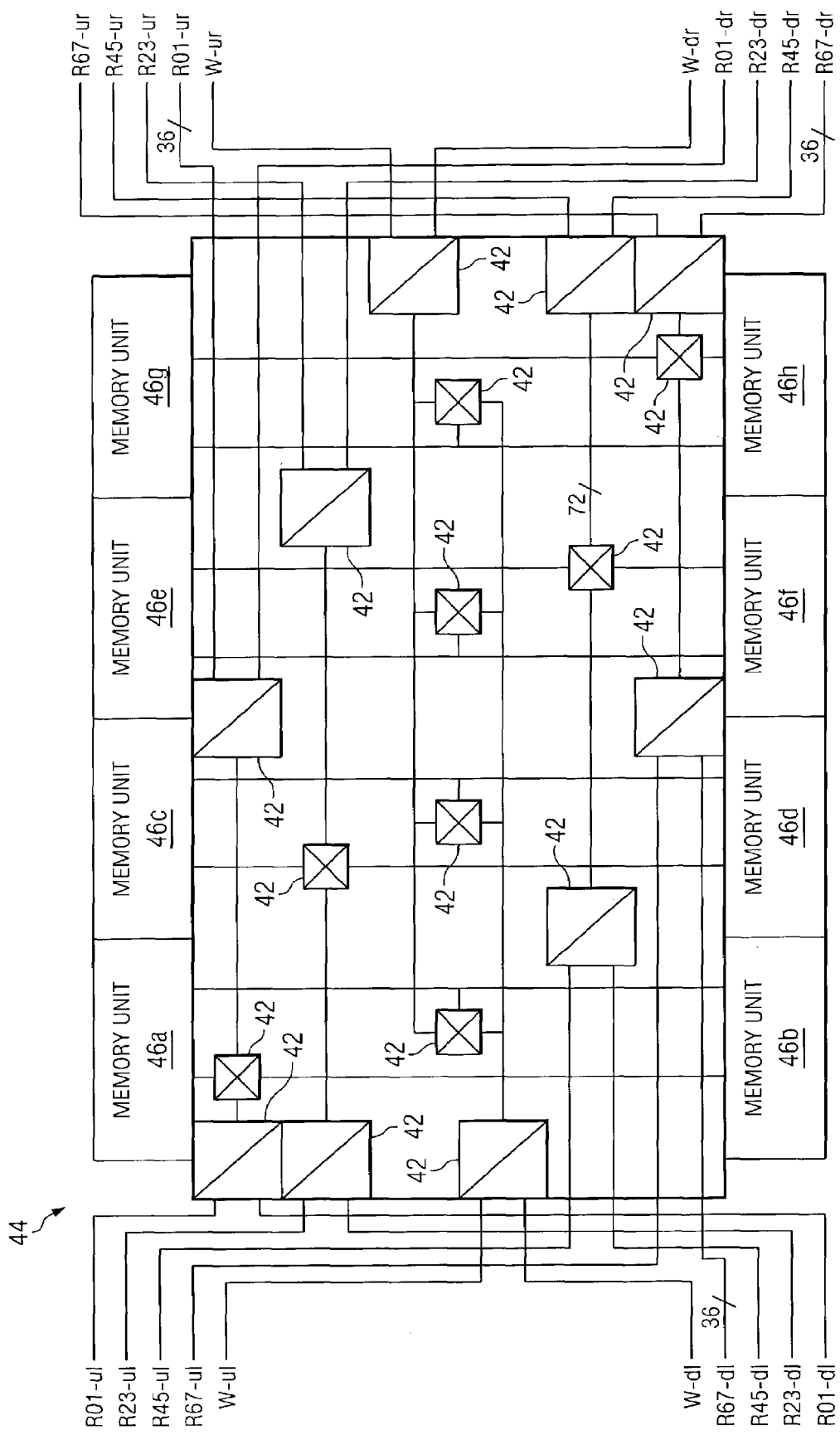
FIG. 8 illustrates an example memory bank of a switch core.

FIG. 8 illustrates an example memory bank 44 of switch core 26. A memory bank 44 includes one or more memory units 46 and one or more bank switching units 42 (which include statically scheduled, regular switching units). In particular embodiments, one or more memory units 46 together include a memory structure 36. In particular embodiments, memory bank 44 includes built-in self-test (BIST) logic. Memory bank 44 is shared by port modules 38, which, in particular embodiments, eliminates head-of-line blocking (thereby increasing the throughput of switch core 26), enables switch core 26 to more efficiently handle changes in load conditions at port modules 38, and reduces memory requirements associated with switch core 26. In particular embodiments, as an example and not by way of limitation, memory bank 44 includes eighteen bank switching units 42 and eight memory units 46 (as illustrated in FIG. 8). Although memory bank 44 is described and illustrated as including a particular number of bank switching units 42 and a particular number of memory units 46, the present invention contemplates memory bank 44 including any suitable number of bank switching units 42 and any suitable number of memory units 46 in any suitable configuration. A memory unit 46 includes one or more SRAM devices. As an example and not by way of limitation, if stream memory 48 includes twenty-four instances of SRAM devices (as described above), stream memory 48 includes three memory banks 44, each memory bank 44 includes eight memory units 46, and each memory unit 46 includes one SRAM device. In particular embodiments, if stream memory 48 is logically divided into 1536 blocks 56 and includes twenty-four memory units 46, each memory unit 46 includes sixty-four blocks 56 of stream memory 48.

The link coupling memory bank 44 to a switching unit 40 includes one or more links. As an example, in particular embodiments, the link coupling memory bank 44 to switching unit 40 includes five links, one for write operations and four for read operations, and each of these links carries thirty-six bits. Memory bank 44 illustrated in FIG. 8 is coupled to four switching units 40, designated ul (up left), dl (down left), ur (up right), and dr (down right), respectively. As an example, ul designates switching unit 40a, dl designates switching unit 40b, ur designates switching unit 40c, and dr designates switching unit 40d. Links designated W are each for write operations to any memory unit 36 from a switching unit 40, and links designated R are each for read operations from particular memory units 46 to switching unit 40. Specifically, links designated R01 are for read operations from memory unit 46a and memory unit 46b; links designated R23 are for read operations from memory unit 46c and memory unit 46d; links designated R45 are for read operations from memory unit 46e and memory unit 46f, and links designated R67 are for read operations from memory unit 46g and memory unit 46h. The links designated -ul couple memory bank 44 to switching unit 40a, the links designated -dl couple memory bank 44 to switching unit 40b, the links designated -ur couple memory bank 44 to switching unit 40c, and the links designated -dr couple memory bank 44 to switching unit 40d. Thus, the link designated R01-ul is for read operations from memory units 46a and 46b to switching unit 40a, the link designated W-dr is for write operations to any memory unit 46 from switching unit 40d, the link designate R67-ur is for read operations from memory units 46g and 46h to switching unit 40c, and so on. If switching unit 40 is coupled to three port modules 38 and three memory banks 44 (as illustrated in FIG. 4), switching unit 40 includes a 3×3, 36-bit switching unit for write operations and a 12×3, 36-bit switching unit for read operations.

Figure 9:
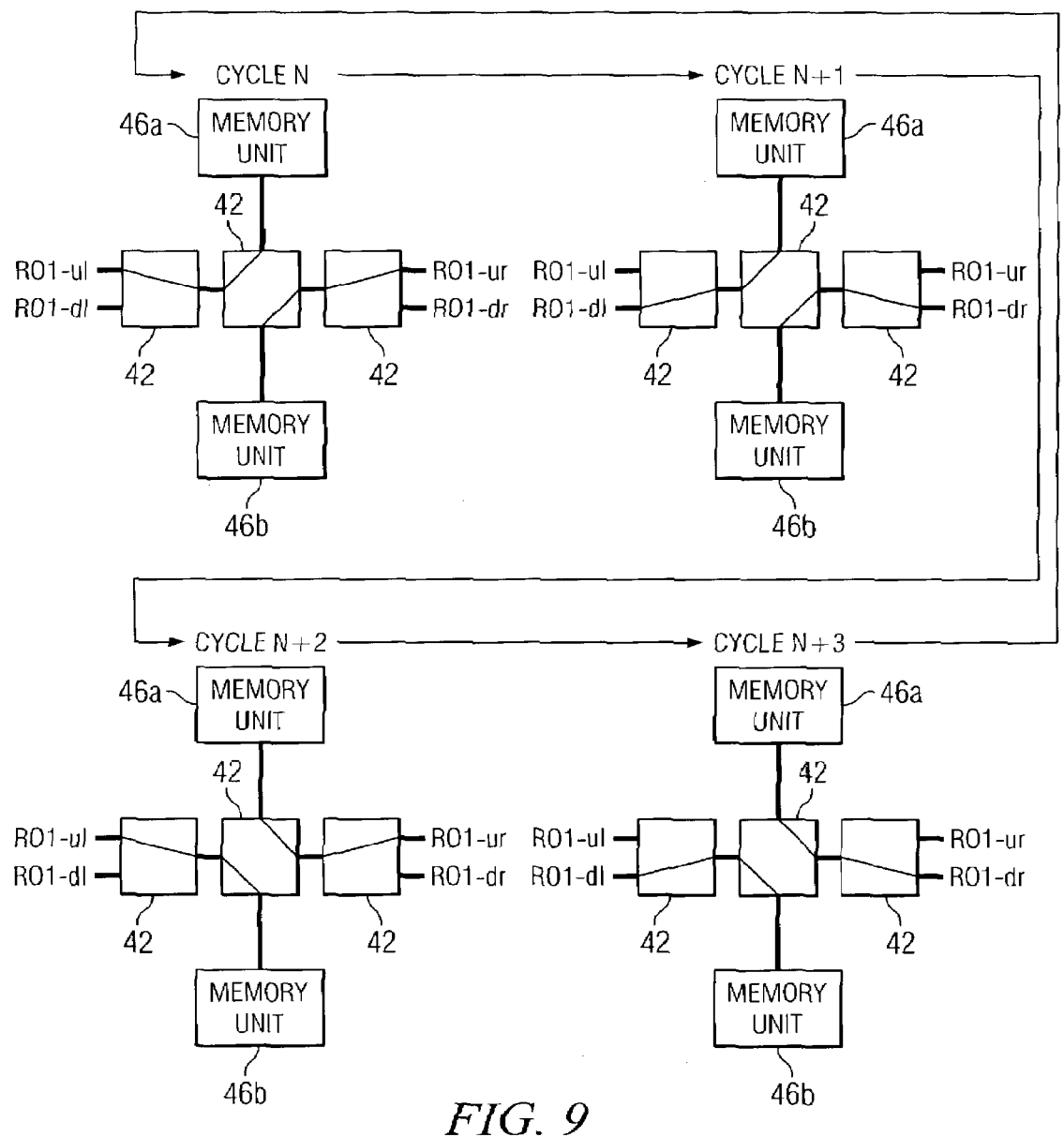
FIG. 9 illustrates example scheduling at three bank switching units of a memory bank for read operations to two memory units via four switching units.

As described above, bank switching units 42 include statically scheduled, regular switching units. FIG. 9 illustrates example scheduling at three bank switching units 42 of a memory bank 44 for read operations to two memory units 46 via four switching units 40. In cycle N, the link designated R01-ul (which is for read operations from memory units 46a and 46b to switching unit 40a) is scheduled to read from memory unit 46a, and the link designated R01-ur (which is for read operations from memory units 46a and 46b to switching unit 40c) is scheduled to read from memory unit 46b. In cycle N+1, the link designated R01-dl (which is for read operations from memory units 46a and 46b to switching unit 40b) is scheduled to read from memory unit 46a, and the link designated R01-dr (which is for read operations from memory units 46a and 46b to switching unit 40d) is scheduled to read from memory unit 46b. In cycle N+2, the link designated R01-ul is scheduled to read from memory unit 46b, and the link designated R01-ur is scheduled to read from memory unit 46a. And, in cycle N+3, the link designated R01-dl is scheduled to read from memory unit 46b, and the link designated R01-dr is scheduled to read from memory unit 46a. Similar scheduling is used for read operations to other pairs of memory units 46, such as memory units 46c and 46d, memory units 46e and 46f, and memory units 46g and 46h. Although a particular schedule at a particular number of bank switching units 42 over a particular number of cycles for read operations to a particular number of memory units 46 via a particular number of switching units 40 is described and illustrated, the present invention contemplates any suitable schedule at any suitable number of bank switching units 42 over any suitable number of cycles for read operations to any suitable number of memory units 46 via any suitable number of switching units 40.

Figure 10:
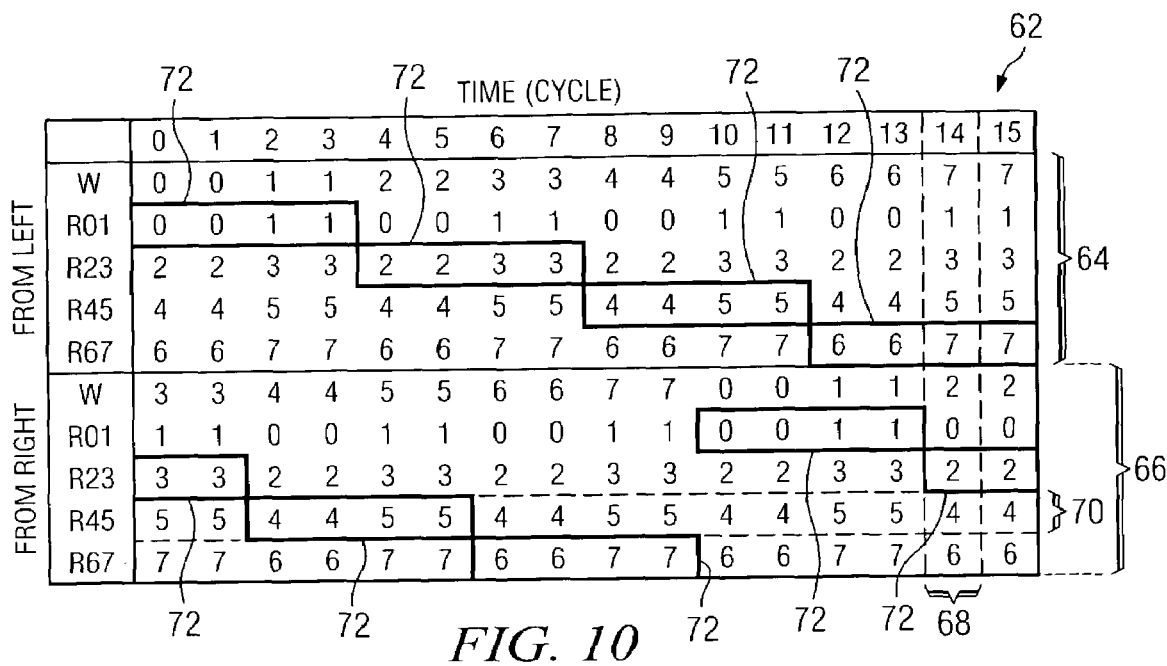
FIG. 10 illustrates example scheduling for write operations to and read operations from eight memory units of a memory bank via four switching units.

FIG. 10 illustrates example scheduling for write operations to and read operations from eight memory units 46 of a memory bank 44 via four switching units 40. Each memory unit 46 is designated in schedule 62 by a number from zero to seven: memory unit 46a is designated by the number zero; memory unit 46b is designated by the number one; memory unit 46c is designated by the number two; memory unit 46d is designated by the number three; memory unit 46e is designated by the number four; memory unit 46f is designated by the number five; memory unit 46g is designated by the number six; and memory unit 46h is designated by the number seven. Upper half 64 of schedule 62 applies to the links coupling switching units 40a and 40b to memory bank 44, and lower half 66 of schedule 62 applies to the links coupling switching units 40c and 40d to memory bank 44. Columns 68 corresponding to even cycles (zero, two, four, six, eight, ten, twelve, and fourteen) apply to the links coupling switching units 40a and 40c to memory bank 44, and columns 68 corresponding to odd cycles (one, three, five, seven, nine, eleven, thirteen, and fifteen) apply to the links coupling switching units 40b and 40d to memory bank 44. Rows 70 correspond, respectively, to the links coupling switching units 40a, 40b, 40c, and 40d to memory bank 44.

Areas 72 indicate where read operations cannot take place due to conflicts with write operations.

According to schedule 62, at cycle zero, the link designated W-ul (which is for write operations via switching unit 40a) can be used for one or more write operations to memory unit 46a; the link designated R23-ul (which is for read operations from memory units 46c and 46d via switching unit 40a) can be used for one or more read operations from memory unit 46c; the link designated R45-ul (which is for read operations from memory units 46e and 46f via switching unit 40a) can be used for one or more read operations from memory unit 46e; the link designated R67-ul (which is for read operations from memory units 46g and 46h via switching unit 40a) can be used for one or more read operations from memory unit 46g; the link designated W-ur (which is for write operations via switching unit 40c) can be used for one or more write operations to memory unit 46d; the link designated R01-ur (which is for read operations from memory units 46c and 46d via switching unit 40c) can be used for one or more read operations from memory unit 46b; the link designated R45-ur (which is for read operations from memory units 46e and 46f via switching unit 40c) can be used for one or more read operations from memory unit 46f; and the link designated R67-ur (which is for read operations from memory units 46g and 46h via switching unit 40c) can be used for one or more read operations from memory unit 46h.

At cycle one, the link designated W-dl (which is for write operations via switching unit 40b) can be used for one or more write operations to memory unit 46a; the link designated R23-dl (which is for read operations from memory units 46c and 46d via switching unit 40b) can be used for one or more read operations from memory unit 46c; the link designated R45-dl (which is for read operations from memory units 46e and 46f via switching unit 40b) can be used for one or more read operations from memory unit 46e; the link designated R67-dl (which is for read operations from memory units 46g and 46h via switching unit 40b) can be used for one or more read operations from memory unit 46g; the link designated W-dr (which is for write operations via switching unit 40d) can be used for one or more write operations to memory unit 46d; the link designated R01-dr (which is for read operations from memory units 46c and 46d via switching unit 40d) can be used for one or more read operations from memory unit 46b; the link designated R45-dr (which is for read operations from memory units 46e and 46f via switching unit 40d) can be used for one or more read operations from memory unit 46f; and the link designated R67-dr (which is for read operations from memory units 46g and 46h via switching unit 40d) can be used for one or more read operations from memory unit 46h.

At cycle two, the link designated W-ul can be used for one or more write operations to memory unit 46b; the link designated R23-ul can be used for one or more read operations from memory unit 46d; the link designated R45-ul can be used for one or more read operations from memory unit 46f; the link designated R67-ul can be used for one or more read operations from memory unit 46h; the link designated W-ur can be used for one or more write operations to memory unit 46e; the link designated R01-ur can be used for one or more read operations from memory unit 46a; the link designated R23-ur (which is for read operations from memory units 46c and 46d via switching unit 40c) can be used for one or more read operations from memory unit 46c; and the link designated R67-ur can be used for one or more read operations from memory unit 46g.

This process continues according to schedule 62, reaching the initial state (which is cycle zero) after sixteen cycles. Although a particular schedule for write operations to and read operation from a particular number of memory units 46 of a memory bank 44 via a particular number of switching units 40 over a particular number of cycles is described and illustrated, the present invention contemplates any suitable schedule for write operations to and read operation from any suitable number of memory units 46 of a memory bank 44 via any suitable number of switching units 40 over any suitable number of cycles.

Figure 11:
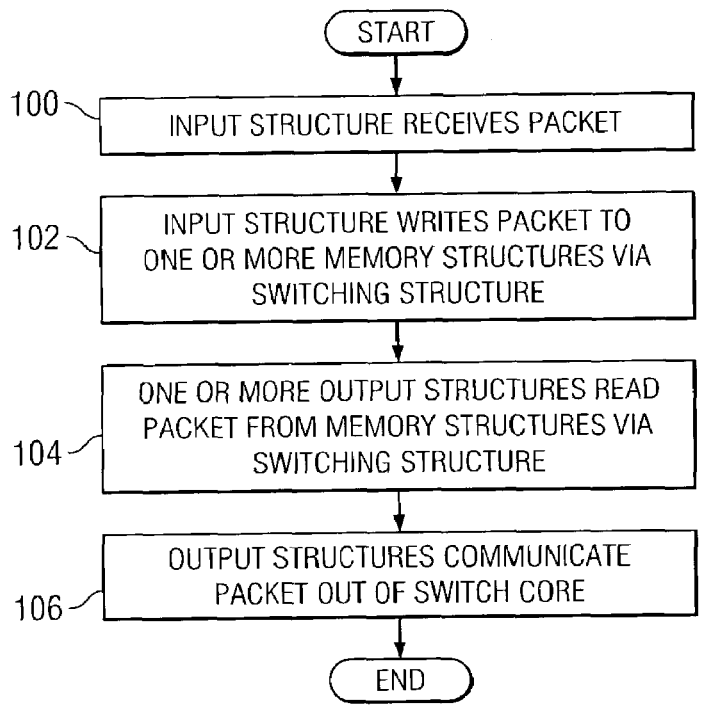
FIG. 11 illustrates an example method for switching a packet using a switch core.

FIG. 11 illustrates an example method for switching a packet using switch core 26. The method begins at step 100, where an input structure 30 receives a packet from a first port 24 of switch 22 that was communicated from a first component of system area network 10. At step 102, input structure 30 writes the packet to one or more memory structures 36 via switching structure 34a. At step 104, one or more output structures 32 read the packet from memory structures 36 via switching structure 34b. At step 106, output structures 32 communicate the packet out of switch core 26 to one or more ports 24 of switch 22 for communication to one or more second components of system area network 10, at which point the method ends. Although particular steps of the method illustrated in FIG. 11 are described and illustrated as occurring in a particular order, the present invention contemplates any suitable steps of the method described above occurring in any suitable order.

Although the present invention has been described with several embodiments, sundry changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A system for switching packets in a high-speed switching environment, the system comprising:
   one or more memory structures;
   a plurality of input structures that are each operable to write to each of the one or more memory structures
   a first switching structure coupling the input structures to the one or more memory structures such that each of the input structures is operable to write to each of the one or more memory structures;
   a plurality of output structures that are each operable to:
      read from each of the one or more memory structures; and
      communicate a first portion of a packet to a first component of a communications network before an input structure has received a second portion of the packet from a second component of the communications network; and
   a second switching structure coupling the plurality of output structures to the one or more memory structures such that each of the output structures is operable to read from each of the one or more memory structures, the second switching structure being coupled to the one or more memory structures by a first number of links and being coupled to the plurality of output structures by a second number of links, the first number of links being twice or more the second number of links.

2. The system of claim 1, wherein:
   each of the one more memory structures comprises one or more memory units that each comprise one or more memory devices;

a port module comprises one of the input structures and one of the output structures; and an interconnection network comprises the first and second switching structures, the interconnection network comprising a hierarchical structure that comprises one or more switching stages.

3. The system of claim 2, wherein the interconnection network comprises a multistage interconnection network (MIN) comprising one or more memory banks and one or more switching units coupling the plurality of port modules to the one or more memory banks, the one or more memory banks each comprising one or more memory units and one or more bank switching units.

4. The system of claim 3, wherein:
each port module is coupled to a switching unit by a first link for write operations and a second link for read operations; and
each switching unit is coupled to each memory bank by a third link for write operations and four fourth links for read operations.

5. The system of claim 3, wherein the MIN comprises three memory banks and four switching units, each memory bank comprising eight memory units that each comprise one memory device.

6. The system of claim 2, wherein the memory devices comprise static random access memory (SRAM) devices.

7. The system of claim 6, wherein the SRAM devices comprise one port for read operations and one port for write operations.

8. The system of claim 1, wherein the system is embodied in a single integrated circuit (IC).

9. The system of claim 1, wherein the high-speed switching environment is an Ethernet switching environment, an INFINIBAND switching environment, a 3GIO switching environment, a HYPERTRANSPORT switching environment, a RAPID IO switching environment, or a proprietary backplane switching environment.

10. A method for switching packets in a high-speed switching environment, the system comprising:
receiving, at one of a plurality of input structures, a packet communicated from a first component of a communications network;
writing the received packet to one or more of one or more memory structures, the plurality of input structures being coupled to the one or more memory structures by a first switching structure such that each of the input structures is operable to write to each of the one or more memory structures;
reading the packet from the memory structures to one or more of a plurality of output structures, the plurality of output structures being coupled to the one or more memory structures by a second switching structure such that each of the plurality of output structures is operable to read from each of the one or more memory structures, each of the one or more output structures being operable to read a first portion of the packet from the memory structures before the input structure has received a second portion of the packet, the second switching structure being coupled to the one or more memory structures by a first number of links and being coupled to the plurality of output structures by a second number of links, the first number of links being twice or more the second number of links; and
communicating the packet from the one or more of the plurality of output structures to one or more second components of the communications network.

11. The method of claim 10, wherein:
each of the one more memory structures comprises one or more memory units that each comprise one or more memory devices;
a port module comprises one of the input structures and one of the output structures; and
an interconnection network comprises the first and second switching structures, the interconnection network comprising a hierarchical structure that comprises one or more switching stages.

12. The method of claim 11, wherein the interconnection network comprises a multistage interconnection network (MIN) comprising one or more memory banks and one or more switching units coupling the plurality of port modules to the one or more memory banks, the one or more memory banks each comprising one or more memory units and one or more bank switching units.

13. The method of claim 12, wherein:
each port module is coupled to a switching unit by a first link for write operations and a second link for read operations; and
each switching unit is coupled to each memory bank by a third link for write operations and four fourth links for read operations.

14. The method of claim 12, wherein the MIN comprises three memory banks and four switching units, each memory bank comprising eight memory units that each comprise one memory device.

15. The method of claim 11, wherein the memory devices comprise static random access memory (SRAM) devices.

16. The method of claim 15, wherein the SRAM devices comprise one port for read operations and one port for write operations.

17. The method of claim 10, wherein the method is executed by a single integrated circuit (IC).

18. The method of claim 10, wherein the high-speed switching environment is an Ethernet switching environment, an INFINIBAND switching environment, a 3GIO switching environment, a HYPERTRANSPORT switching environment, a RAPID IO switching environment, or a proprietary backplane switching environment.

19. A system for switching packets in a high-speed switching environment comprising an Ethernet switching environment, an INFINIBAND switching environment, a 3GIO switching environment, a HYPERTRANSPORT switching environment, a RAPID IO switching environment, or a proprietary backplane switching environment, the system being embodied in single integrated circuit (IC) and comprising:
one or more memory structures that each comprise one or more memory units, each of the memory units comprising one or more memory devices that each comprise a static random access memory (SRAM) device that comprises one port for read operations and one port for write operations;
a plurality of input structures that are each operable to write to each of the one or more memory structures
a plurality of output structures that are each operable to:
read from each of the one or more memory structures; and
communicate a first portion of a packet to a first component of a communications network before an input structure has received a second portion of the packet from a second component of the communications network; and
a multistage interconnection network (MIN) operable to couple the input structures and the output structures to the one or more memory structures, the MIN comprising a hierarchical structure of one or more switching stages that comprises one or more memory banks and one or more switching units coupling the plurality of port modules to the one or more memory banks, the one or more memory banks each comprising one or more memory units and one or more bank switching units.

20. A system for switching packets in a high-speed switching environment, the system comprising:

means for receiving, at one of a plurality of input structures, a packet communicated from a first component of a communications network;

means for writing the received packet to one or more of one or more memory structures, the plurality of input structures being coupled to the one or more memory structures by a first switching structure such that each of the input structures is operable to write to each of the one or more memory structures;

means for reading the packet from the memory structures to one or more of a plurality of output structures, the plurality of output structures being coupled to the one or more memory structures by a second switching structure such that each of the plurality of output structures is operable to read from each of the one or more memory structures, each of the one or more output structures being operable to read a first portion of the packet from the memory structures before the input structure has received a second portion of the packet, the second switching structure being coupled to the one or more memory structures by a first number of links and being coupled to the plurality of output structures by a second number of links, the first number of links being twice or more the second number of links; and means for communicating the packet from the one or more of the plurality of output structures to one or more second components of the communications network.

* * * * *

UNITED STATES PATENT AND TRADEMARK OFFICE
CERTIFICATE OF CORRECTION

PATENT NO. : 7,242,684 B2  Page 1 of 1
APPLICATION NO. : 10/360094
DATED : July 10, 2007
INVENTOR(S) : Yukihiro Nakagawa et al.

It is certified that error appears in the above-identified patent and that said Letters Patent is hereby corrected as shown below:

Column 1, Line 5, after "ARCHITECTURE FOR SWITCHING PACKETS IN A HIGH-SPEED SWITCHING ENVIRONMENT" insert the following:

-- TECHNICAL FIELD OF THE INVENTION

This invention relates generally to communication systems and more particularly to architecture for switching packets in a high-speed switching environment. --

Signed and Sealed this

Fourteenth Day of October, 2008

JON W. DUDAS
*Director of the United States Patent and Trademark Office*